United States Patent
Wells et al.

(10) Patent No.: US 7,208,669 B2
(45) Date of Patent: Apr. 24, 2007

(54) VIDEO GAME SYSTEM AND METHOD

(75) Inventors: Robert V. Wells, Huntsville, AL (US); Brian K. Mitchell, Huntsville, AL (US); Jeremy S. Reddoch, Madison, AL (US); William A. Koons, Madison, AL (US)

(73) Assignee: Blue Street Studios, Inc., Huntsville, AL (US)

( * ) Notice: Subject to any disclaimer, the term of this patent is extended or adjusted under 35 U.S.C. 154(b) by 80 days.

(21) Appl. No.: 10/925,778

(22) Filed: Aug. 25, 2004

(65) Prior Publication Data

US 2005/0045025 A1 Mar. 3, 2005

Related U.S. Application Data

(60) Provisional application No. 60/497,453, filed on Aug. 25, 2003.

(51) Int. Cl.
*A63J 17/00* (2006.01)

(52) U.S. Cl. .......................... 84/601; 84/464 R; 463/35

(58) Field of Classification Search ................. 84/601, 84/464 R; 715/500.1; 434/236; 463/35, 463/36; 273/138.1; 345/473; 704/251, 704/275

See application file for complete search history.

(56) References Cited

U.S. PATENT DOCUMENTS

| | | | |
|---|---|---|---|
| 5,513,129 A * | 4/1996 | Bolas et al. ................... 703/13 |
| 5,754,660 A | 5/1998 | Shimizu | |
| 5,880,788 A * | 3/1999 | Bregler ....................... 348/515 |
| 6,001,013 A | 12/1999 | Ota | |
| 6,369,822 B1 * | 4/2002 | Peevers et al. ............. 345/473 |
| 6,464,585 B1 | 10/2002 | Miyamoto et al. | |
| 6,485,369 B2 | 11/2002 | Kondo et al. | |
| 6,542,869 B1 | 4/2003 | Foote | |
| 6,717,042 B2 * | 4/2004 | Loo et al. ................. 84/464 R |
| 6,898,759 B1 * | 5/2005 | Terada et al. ............ 715/500.1 |
| 7,025,675 B2 | 4/2006 | Fogel et al. | |
| 7,026,536 B2 | 4/2006 | Lu et al. | |
| 2004/0220812 A1 * | 11/2004 | Bellomo et al. ............ 704/275 |

* cited by examiner

*Primary Examiner*—Lincoln Donovan
*Assistant Examiner*—David S. Warren
(74) *Attorney, Agent, or Firm*—Thomas, Kayden, Horstemeyer, & Risley, L.L.P.

(57) ABSTRACT

A video game system comprises memory for storing data defining graphical objects for use in a video game. The system further comprises logic configured to enable a user to select at least one musical song to be played during a run of the video game. The logic is further configured to control at least one of the graphical objects during the run of the video game based on an attribute correlated with the selected song.

55 Claims, 19 Drawing Sheets

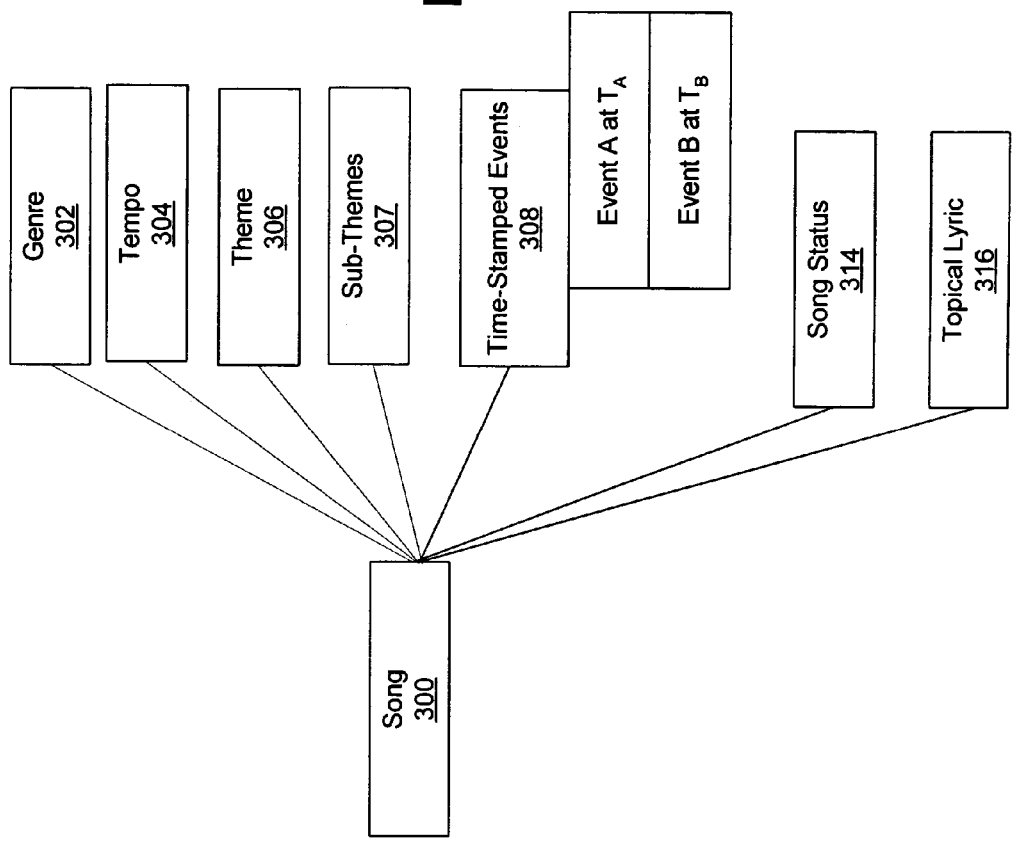

VIDEO GAME SYSTEM AND METHOD

CROSS REFERENCE TO RELATED APPLICATION

This application claims priority to U.S. Provisional Application No. 60/497,453, entitled "Method for Incorporating and Using Music in Video Games," and filed on Aug. 25, 2003, which is incorporated herein by reference.

RELATED ART

Video games oftentimes employ sound (e.g., music and/or sound effects) during game play in order to add variety to the gaming environment and to pique a user's interest during game play.

As an example, video games from the arcade-style genre are often configured such that the user controls a fictitious character that navigates through multiple levels of courses that are each full of obstacles and adversaries that attempt to keep the user character from reaching the end of the course as quickly as possible and stop the user character from collecting scoring items along the way. In such a video game, particular music may be associated with each level or course that the character must navigate, the tempo of the music may be changed during intense situations, and/or particular music may be associated with situations during the during each level such as release of some adversary or activation of a time limited special power for the user character.

In other examples, lights may appear to blink to the beat of music or other objects may appear to behave in other ways to the beat of music. The use of music or other sounds to enhance a gaming environment is pervasive in the gaming industry.

One type of video game, referred to as a Simulation game ("SIM game"), is a computer video game that attempts to simulate real life situations. Typically, SIM games provide a graphical gaming environment and an objective or goal that a user works toward.

For example, one popular SIM game is configured to enable a user to build and design a city. The player creates zoning areas in the city, e.g., commercial, industrial, or residential, and he adds building to the city accordingly. Further, the user can implement taxes, build transportation systems, enact city ordinances, build a power grid, build parks, and the like. Throughout game play, the user may experience natural or unnatural disasters that impede his ability to build the city. Additionally, as the game progresses, the user is rewarded with, for example, a mayoral mansion within the simulated city.

In another SIM game example, a user engages in creating characters and controlling the lives of the characters created. The goal of the game is to enable each character to reach determined personal achievement goals. Throughout the game, the user controls the behaviors of the characters created. For example, the user controls sleeping, eating, cooking, and bathing habits. The game employs artificial intelligence, allowing the characters to exercise some free will during game play. In this regard, rather than control some of the characters directly, the user establishes various attributes (e.g., personality attributes) associated with the characters, and the characters automatically perform various actions based on the user-defined attributes.

Today, video games exhibit a wide variety of methods for controlling objects within the gaming environment. Although characters and other objects appear to interact with sounds within the gaming environments, such sounds do not usually provide a basis for automatically controlling the behavior of the characters or other objects nor do the games allow users to select music or sounds that are then used within the game to substantially define or modify the primary objects of the game and their associated behavior and interrelationships.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 3 is a data diagram illustrating an exemplary template for attributes associated with a song incorporated into the game unit illustrated in FIG. 2.

DETAILED DESCRIPTION

Embodiments of the present disclosure generally pertain to video gaming systems and methods for controlling video game object features and behaviors via selected sounds, such as music, provided by the gaming systems. In one embodiment, such sounds are selected by a user playing a game provided by a game unit. In another embodiment, sounds are selected by another individual, such as, for example, a gaming system manager located remote from the game unit or a person that is in the business of selling music, e.g., a retailer or a person associated with a record label.

A system in accordance with one embodiment of the present disclosure allows a user to select particular types of music and/or particular songs, and music selected by the user affects particular elements and/or the behavior of particular elements in the gaming environment. Specifically, the system uses the music selected for play to initialize the game objects, their behavior, and their interrelationships based uniquely on each unique selection of music. Additionally, as the system plays, the selected music, the features and/or behavior of objects and/or characters in game are automatically controlled based on the music selected.

Figure 1:
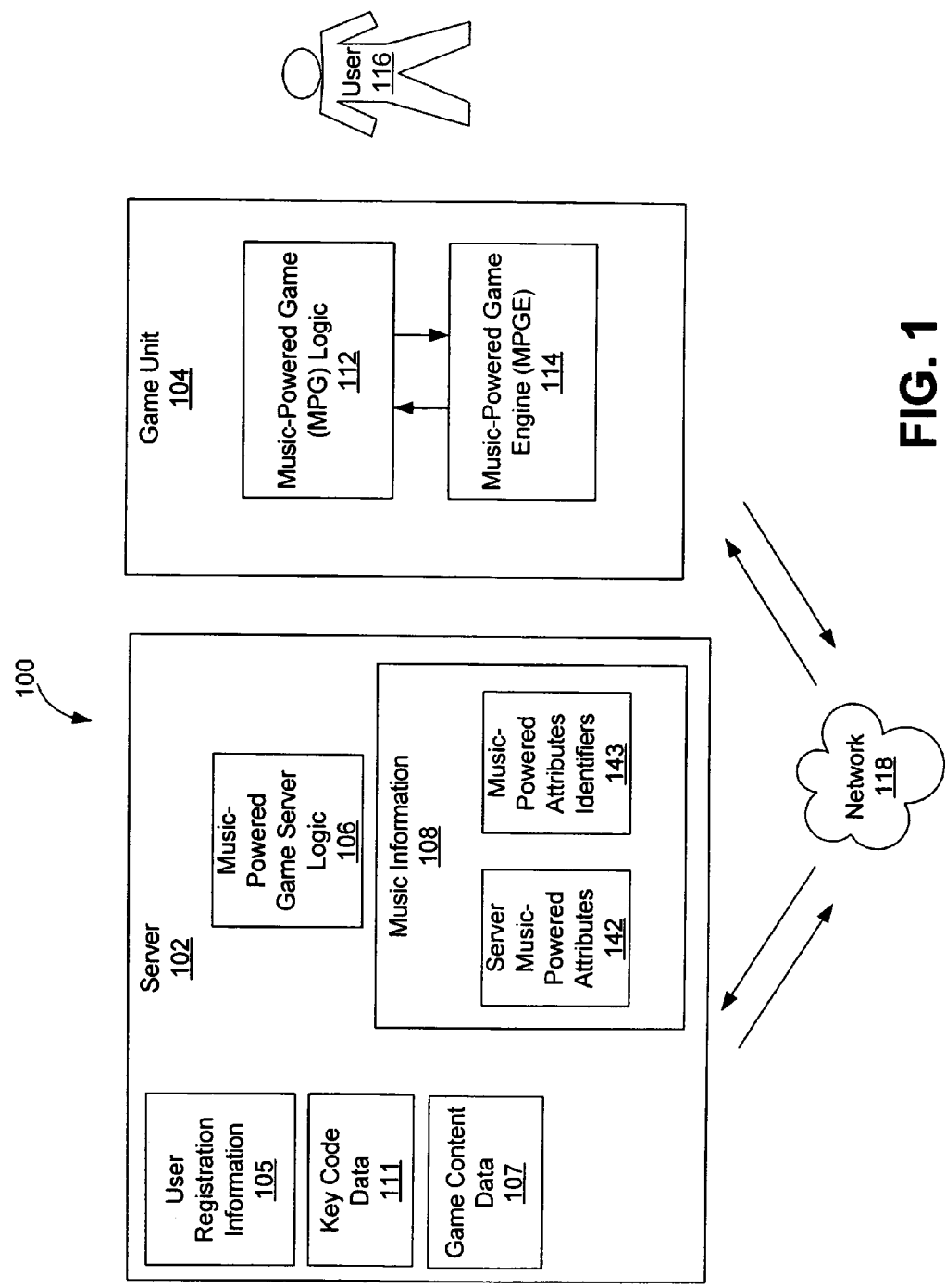
FIG. 1 is a block diagram illustrating a gaming system in accordance with an exemplary embodiment of the present disclosure.

FIG. 1 depicts a video gaming system 100 in accordance with one exemplary embodiment of the present disclosure. The system 100 comprises a server 102 and a game unit 104 communicating via a network 118.

The server 102 comprises music-powered game server (MPGS) logic 106, game content data 107, and music information 108. Note that a music-powered game generally refers to a video game in which selected sounds (e.g., music) affect events that occur during game play, the features and/or behaviors of video game objects, including objects representative of characters or inanimate objects, within the game, and/or the general look and feel of the gaming environment, such as will be described hereafter.

The music information 108 preferably comprises music-powered attributes 142 and associated identifiers 143. The music-powered attributes 142 can comprise subsets of music-powered attributes 142 associated with a song, an album, and/or an artist, and the identifiers 143 preferably uniquely identify each set of music-powered attributes 142, such that the MPGS logic 106 can retrieve a set of music-powered attributes 142 associated with a song, an album, and/or an artist upon request.

Note that the music-powered attribute identifiers 143 may comprise a universally recognized identification schema. For example, the music-powered attribute identifiers 143 may identify a set of music-powered attributes 142 associated with a song by the song's unique barcode, or the music-powered attribute identifiers 143 may identify a set of music-powered attributes 142 associated with an album by the album's title and/or artist.

The music-powered attributes 142 comprise data that describes, defines, or otherwise gives detailed information about the song, the album, and/or the artist with which the music-powered attributes 142 are associated. The music-powered attributes 142 associated with a particular song, album, and/or artist can comprise music-powered attributes 142, such as, for example, genre, tempo, theme, a plurality of sub-themes, song or album title, topical attributes corresponding to the lyrics of the particular song, instantaneous events, hit rating, and crossover attributes, hereinafter referred to as the "music-powered song attributes."

Additionally, music-powered attributes 142 defining, describing or otherwise providing information about an album can comprise music-powered attributes 142 associated with the album's color scheme, specific graphics associated with the album, and the like, hereinafter referred to as "music-powered album attributes." Further, music-powered attributes 142 defining, describing or otherwise providing information about an artist can comprise music-powered attributes 142 associated with current events that are occurring relating to the artist, the artist's likes/dislikes, the artist's pet, and the like, hereinafter referred to as "music-powered artist attributes."

These are only a few examples of various music-powered attributes 142 that can be used to provide information regarding a song, an album, and/or an artist, and other music-powered attributes 142 in other embodiments are possible.

The game content data 107 preferably comprises information that can be used to change the gaming environment. For example, game content data 107 can define models, motions, artwork, characters, objects, and game object attributes and scripts that utilize the data in conjunction with music-powered game (MPG) logic 112, described further herein.

Note that a script refers to logic that provides a list of commands or actions to perform which are interpreted by the logic of a video game and provide the game developer the ability to quickly modify game play without changing the compiled video game logic. Two examples of script languages that are widely used in the video game industry are Python and Lua.

The game content data 107 can change periodically. Further, game content data 107 can be associated with the music-powered attributes 142. In this regard, as described herein, the music-powered attributes 142 may designate a color scheme for a particular album. Thus, the palette associated with the color scheme designated in the music-powered attributes 142 associated with the album can be contained within the game content data 107, as well as any art and/or graphics associated with the album.

Additionally, the game content data 107 can comprise advertisement information associated with a particular advertising campaign where an advertiser wishes to promote itself in association with particular music that consumer may enjoy in a music-powered game. As a specific example, if during a specified period of time, Coca-Cola desires to advertise its coke product in the gaming environment to consumers that enjoy hip-hop, then the game content data 107 can comprise graphics associated with virtual posters and/or billboards to be exhibited throughout the gaming environment related to Coca-Cola, and the system 100 will only display those virtual posters and/or billboards when consumers are playing music that contains the "hip-hop" value in its genre music-powered attribute 142.

Additionally, if the gaming environment pertains to a nightclub, and Coca-Cola desires to advertise in the nightclub, the game content 107 may comprise data representative of a Coca-Cola billboard that is to be placed in the nightclub. Further, the game content data 107 may comprise a fanciful Coca-Cola lyric to be played periodically throughout game play, for example when the nightclub music is not playing, and the patrons are not dancing. Note that such lyrics can have associated with it a set of music-powered attributes 142. For example, the music-powered attributes 142 may indicate a particular moment within the game play to play the jingle, and the music-powered attributes 142 may adjectively provide character emotions, motions, and/or events to be utilized during game play to affect video game objects within the gaming environment.

As another example, a particular artist may desire to promote his/her fan club. Thus, the game content data 107 may define a virtual poster of the artist that is to appear within the gaming environment provided by the system 100. Further, the game content data 107 may comprise graphical data that defines an animated representation (i.e., a character) resembling the artist and associated artist attributes, as will be described further herein. The game content data 107 may further indicate when the animated version of the artist is to appear in a game, such as, for example, when a song performed by the artist is played in the gaming environment. The animated representation of the artist may perform the song during game play, as well.

In the embodiment shown by FIG. 1, the game unit 104 comprises music-powered game (MPG) logic 112 and a music-powered game engine ("MPG engine") 114. Generally, the MPG logic 112 and the MPG engine 114 work in conjunction to provide a music-powered video game to a user 116 of the game unit 104. During the course of game play, the game unit 104 displays a game environment wherein events that occur during game play, the features and/or behaviors of video game objects, including objects representative of characters or inanimate objects, within the game, and/or the general look and feel of the gaming environment are controlled via selected music that is audible to the user 116.

The MPGS logic 106 communicates with the MPG engine 114 on the game unit 104 via the network 118. The MPGS logic 106 transmits music information 108 associated with songs that are selected for play in the gaming environment via the network 118 to the MPG engine 114. Note that music selection inputs may be provided by the user 116, by the MPG engine 114, by the MPGS logic 106, or by an external source (not shown), such as, for example, a set of promotional music and associated music-powered attributes 142 may be created, selected, and provided by a music label. The MPG engine 114 preferably stores the music information 108 associated with songs that are selected for play on the game unit 104, and provides the music information 108 to the MPG logic 112, which is described in more detail with reference to FIG. 2.

The MPG logic 112 and the MPG engine 114 control events that occur during game play, features and/or behaviors of video game objects, including objects representative of characters or inanimate objects, within the game, and/or the general look and feel of the gaming environment, based upon music selections. As described hereinafter, such selections may be based on and controlled by inputs that are provided by the user 116. The MPG logic 112 controls events that occur during game play, features and/or behaviors of video game objects, including objects representative of characters or inanimate objects, within the game, and/or the general look and feel of the gaming environment by utilizing the music-powered attributes 142 associated with one or more songs, hereinafter referred to as "song attributes," played by the game unit 104 in accordance with the song selections made by a music-selection source, e.g., the user 116. Additionally, the MPG logic 112 can also affect events that occur during game play, the features and/or behaviors of video game objects, including objects representative of characters or inanimate objects, within the game, and/or the general look and feel of the gaming environment using the music-powered album attributes and the music-powered artist attributes.

Although the embodiment being described indicates that the MPG engine 114 receives music selection inputs from the user 116, the music selection inputs may also be provided by other sources in other embodiments of the gaming system 100. In this regard, music can be selected by the user 116, or the game can internally make selection and/or other external sources, e.g., digital radio, can provide the music selection inputs. Furthermore, music selection inputs can be provided by retailers via promotions, described further herein and record labels promoting a concert or an album.

For example, the MPGS logic 106 may provide music selection inputs indicative of promotional music and music-powered promotional attributes described hereafter, to the MPG engine 114. Note that the music-powered promotional attributes are preferably a subset of the music-powered attributes 142. The promotional music and music-powered promotional attributes 142 may be generated by a record label, for example, that desires to promote particular music associated with a particular album and/or artist, and the music-powered promotional attributes 142 describe and/or define the promotional music, much like the music-powered song attributes described hereinabove describe and define a particular song. Thus, music retailers that have access to the server 102 may desire to promote a particular song or artist corresponding to available music inventory that the retailer may have in its store and that the retailer desires to promote. The MPGS logic 106 may then transmit music selection inputs indicative of promotional music and promotional attributes to the game units 104 of users 116 that correspond to the available inventory or sales items of retailers in the same region as the user 116.

Regardless of the source of the music selection inputs, during game play, the MPG engine 114 provides the MPG logic 112 with a listing, referred to as a "playlist," of music tracks corresponding to the music selection inputs. Such a playlist 120 (FIG. 2) is described in more detail with reference to FIG. 2. The playlist 120 (FIG. 2) identifies the songs that are to be played during game play and can specify the sequence that such songs are to be played. In one embodiment, the MPG logic 112 displays the playlist 120 (FIG. 2) to the user 116. Thus, as each song is played, the user 116 is able to see the previous song, the next song, and the like.

Furthermore, for the songs played by the MPG engine 114, the MPG engine 114 preferably transmits music-powered attributes 142 associated with such songs to the MPG logic 112. The attributes 142 can be received from a variety of sources. In a preferred embodiment, the music-powered attributes 142 are contained within the music information 108 maintained at the server 102 and are provided to the MPG engine 114 via network 118 by the MPGS logic 106 when the MPG engine 114 requests music-powered attributes 142 associated with particular music, an album, or an artist. As will be described in more detail below, the MPG logic 112 uses the music-powered attributes 142 corresponding to the selected music to make decisions that affect events that occur during game play, the features and/or behaviors of video game objects, including objects representative of characters or inanimate objects, within the game, and/or the general look and feel of the gaming environment. Several of the music-powered song attributes enumerated in the foregoing non-exhaustive list are generally described hereafter, and more detailed examples of several are also provided.

In this regard, the genre of a song describes the established class or categorization of the song. For example, song genre may include rock-and-roll, reggae, classical, country, hip-hop, jazz, and/or rhythm and blues (R&B).

The tempo of a song refers to a song's beat. Tempo can be described adjectivally, such as, for example, fast, slow, or medium. The tempo can also include actual beats per minute.

The general theme of a song can describe what a song is about, for example, love, death, violence, social angst, etc. Sub-themes of a song can describe or include additional themes that relate to the song's overall theme. For example, if the theme of a song is love, then a sub-theme may be "hooking up," dating, arguing, marriage, and/or the like. The music-powered song attributes, in addition to indicating a sub-theme, can indicate the time interval in the song that the sub-theme is addressed.

The music-powered topical song attributes corresponding to the lyrics of a song define specific topics and/or events specifically addressed and/or alluded to in the song lyrics. For example, the song may contain a casual reference to a hurricane, a car wreck, or a falling chandelier. The music-powered song attributes, in addition to indicating a particular topic or event, may also comprise data indicative of when a reference to the topic or event is made in the song. For example, if one of the topics in a song is a hurricane, the music-powered song attributes may indicate the time interval in the song when a verse about a hurricane plays.

An instantaneous event refers to an event that is to occur at a particular point marked within a song. For example, an instantaneous event may refer to breaking glass that is marked to occur when a breaking glass sound effect occurs in the song. The music-powered song attributes can provide data descriptive of instantaneous event and data indicating the point in the song that the event occurs. As an example, in music-powered song attributes associated with the Lynard Skynard song "Freebird," the music-powered song attributes may indicate that, in the last ten seconds of the song, the characters in the gaming environment are to hold up lit cigarette lighters while another song, "Auld Lang Syne," may have a music-powered event attribute that in the last five seconds of the song, the characters in the gaming environment are to grab their date and kiss them.

The music-powered hit rating song attribute refers to data indicative of the industry or market acceptance of the song, such as, for example, how the song might be rated on a national billboard. For example, on a scale of "1" to "10," the hit rating music-powered song attribute might indicate a "10" if the song is a big hit or a "1" if the song is only recognized by a small niche community.

The music-powered crossover song attribute indicates whether the song might be acceptable in more than one genre. For example, the song's genre might be classified as country, but the song may further be thought of in the industry or the market as a dance song, in which case, the crossover music-powered song attribute might indicate a dance song.

Furthermore, each of the music-powered attributes 142, including the music-powered song attributes, can also have an associated magnitude. For example, if a song has a "love" theme, a value can be associated with this theme that indicates to what extent the song is a "love" song. For example, if the song only tangentially pertains to love, then the magnitude associated with the theme may be a "3," for example, on a scale from "1" to "10." However, if "love" is the prevailing theme of the song, then the magnitude associated with the theme may be a "10." Thus, the magnitude of a music-powered attribute 142 can be analyzed to determine the degree to which the music-powered attribute 142 is prevalent in the song.

The music-powered attributes 142, including their corresponding magnitudes, provided by the MPG engine 114 are used by the MPG logic 112 to select, initialize, modify, and/or control events that occur during game play, the features and/or behaviors of video game objects, including objects representative of characters or inanimate objects, within the game, and/or the general look and feel of the gaming environment. The music-powered attributes 142 and their corresponding relationship to the MPG logic 112 and the MPG engine 114 is described in more detail with reference to FIGS. 3–7.

In one embodiment, a song, an album, and/or an artist is "classified" only once, and the music-powered attributes 142 associated with that classification are used by any MPG engine 114 and the MPG logic 112 in initializing, modifying and/or creating events during game play, the features and/or behaviors of video game objects, including objects representative of characters or inanimate objects, within the game, and/or the general look and feel of the gaming environment. "Classifying" is a term that refers to the act of defining and populating music-powered attributes 142 for a particular song, album, and/or artist.

However, in other embodiments, the classification of a song may directly depend upon the gaming environment created by the MPG logic 112. In this regard, a song may be classified differently, for example, for a nightclub game, as opposed to the same song being classified differently for a shooter game.

The MPG engine 114 performs a variety of operations. Specifically, the MPG engine 114 receives music information 108 from the MPGS logic 106, which the MPG engine 114 stores, preferably in a table format, on the game unit 104 for access during game play.

The server 102 also provides to the MPG engine 114 the game content data 107, which comprises information about the video game environment that is directly associated with the music-powered attributes 142 that are new to user 116 and that are to be provided to the user 116, as described hereinabove. Game content data 107 can be repeatedly updated to include new game content that the MPG engine 114 provides to the MPG logic 112 when the user 116 initiates game play, specifically selects new music for use in the game unit 104, or requests new game content data 107 or when a record label, retailer, or the MPGS logic 106 decides to download new game content data 107 to a user 116, as described in more detail with reference to FIG. 14.

Thus, if the user inserts a CD into the game unit 104, and there is new music on the CD that is not yet in the catalog 123 or the authenticated song data 227, as will be described in with reference to FIG. 2, the game 104 unit preferably interacts with the server 102 to retrieve the music-powered attributes 142 from the server 102 associated with each new song. Additionally, the music-powered attributes 142 may comprise album attributes and artist attributes, as described hereinabove. Furthermore, the game content data 107 may also comprise content associated with the song, album, or the artist, which the MPG engine 114 retrieves from the server 102.

If the user 116 elects to receive new game content data 107 from the MPG engine 114, the MPG logic 112 can incorporate events, features and/or behaviors of video game objects, including objects representative of characters or inanimate objects, within the game, and/or the general look and feel of the gaming environment corresponding to the new game content data 107. As an example, the user 116 may elect to receive game content data 107 defining a new three-dimensional (3D) character. In this regard, the MPG logic 112 can place the character in the gaming environment and the character behaves in accordance with music being played in such environment as reflected by the new character's personality. As an example, the MPGS logic 106 may notify the user 116 that there is a modification (an "expansion pack") available for the user's MPG logic 112 that will provide the user 116 a richer game environment and/or more functionality. Thus, the user 116 may elect to request the expansion pack for download.

Note that game content data 107 can be transmitted by the MPGS logic 106 on the server 102 to the MPG engine 114 on the game unit 104. Therefore, the MPGS logic 106 can periodically provide to the game unit 104 updates on the game content data 107. Furthermore, the MPG engine 114 plays music from a local playlist 120 or music received from a stream server (not shown) described further herein.

The user 116 can purchase or otherwise acquire music and associated music-powered attributes 142 for use during game play to affect events that occur during game play, the features and/or behaviors of objects, including video game objects representative of characters or inanimate objects, within the game, and/or the general look and feel of the gaming environment from internet music retailers, such as, for example, Napster. Additionally, the user 116 may purchase a CD from a retailer. When the user 116 purchases the music either through an online service or store retailer, the user 116 can download and/or copy the music to the game unit 104. In order for the music to be used by the MPG logic 112, the user 116 can obtain, via the MPG engine 114, music-powered attributes 142 associated with the music from the music information 108 stored by the server 102, or alternatively the music-powered attributes 142 associated with the music can be obtained directly from the CD purchased in retail or within a music file purchased online.

If the user 116 elects to use new music in the game unit 104, the MPG engine 114 can receive new server music-powered attributes 142 and new game content data 107 from the MPGS logic 106. The MPG engine 114 may then provide the new game content data 107 and the new music-powered attributes 142 to the MPG logic 112, described further with reference to FIG. 2, and the MPG logic 112 can select, initialize modify, create, and/or control events, features and/or behaviors of video game objects, including objects representative of characters or inanimate objects, within the game, and/or the general look and feel of the gaming environment corresponding to the new game content data 107.

As an example, the user 116 may elect to select music for play in the game that references a one-eyed, one-horned, flying purple, people-eater. Thus, the MPG engine 114 may request new game content data 107 and server music-powered attributes 142 and identifiers 143 that define and describe a monster having one-eye, one-horn, flies, and likes to eat people from the server 102. In this regard, the MPG logic 112 can introduce the character to the gaming environment and the character behaves in accordance with music being played in such environment as reflected by the new character's personality. Alternatively, the game content data 107 could have provided a more generic character who's behavior is less driven by the specific music-powered attributes 142 of the new song and more driven by the music-powered attributes 142 of other songs classified in the system.

In some embodiments, key codes can be associated with the purchased music and used to ensure that the music is purchased or otherwise acquired from an authorized retailer or other legitimate source (i.e., the music is not pirated).

Thus, a list of valid key codes can be maintained at the server 102 and/or stored in the game unit 104. Such a list may include each valid key code and an identifier of the song or songs to which it pertains. When the user 116 acquires a song from a legitimate source, the user 116 is preferably provided the valid key code for the song by the legitimate source.

Moreover, before the MPG engine 114 adds a new song to the playlist or otherwise enables the new song to be used in the gaming environment provided by the MPG logic 112, the MPG engine 114 can be configured to request a user-provided key code from the user 116.

In one embodiment, the user 116 manually enters the user-provided key code in response to the foregoing request, which may be displayed to the user 116 as a user prompt. In this regard, the user preferably enters the key code provided by the retailer or other legitimate source at the time of purchase. In another embodiment, the user-provided key code can be automatically acquired by the MPG engine 114. For example, the associated key code may be appended to the data defining the new song or located on the same media of the newly acquired song such that the key code verification process is completely transparent to the user 116.

After obtaining the user-provided key code, the MPG engine 114 can then verify whether the song has been acquired from a legitimate source by having the song's user-provided key code compared to the aforementioned list of valid key codes. Note that the actual comparison may be performed by the MPG engine 114, the MPGS logic 106, or any other system component. If the user-provided key code matches or otherwise corresponds to the valid key code for the new song, the MPG engine 114 is authorized to interface the newly purchased song's music-powered attributes 142 with the MGP logic 112 for use in affecting the gaming environment or behavior of characters or other objects in the game and the server 102 removes the key code from the list of valid key codes 111 to ensure that another user 116 can not use the same legitimately acquired key code. The MPG engine 114 preferably does not add that new song to the playlist until a user-provided key code matches or otherwise corresponds to the song's valid key code.

Additionally, if the user 116 is unable to provide a key code that matches the song's valid key code, music retailers or record labels can provide key codes to the buyer after the purchase, e.g., online. Note that key codes can also be used on a per artist or per album basis such that a single key code can authorize the use of any song by a particular artist or a particular set of songs by one or more artists. Moreover, the MPGS logic 106, via the MPG engine 114, can ensure that music to be used in the gaming environment was legitimately acquired.

In one embodiment, the list of valid key codes is stored at the server 102 as key code data 111, and the operation of such an embodiment will now be described in more detail.

In the instant example, assume that the user 116 purchases a CD and that the seller is an authorized distributor that provides a valid key code to the user 116 associated with the purchase. This valid key code is stored in the key code data 111 and is associated with an identifier that identifies the purchased song.

When a user 116 selects a song to be played in the gaming environment, the MPG engine 114 determines whether a user-provided key code is associated with the song. If so, the MPG engine 114 transmits a request to the MPGS logic 106 to verify whether the song selected by the user 116 was legitimately purchased or acquired. Such a request includes information identifying the selected song as well as the user-provided key code. The MPGS logic 106 determines if the user-provided key code matches the song's valid key code stored in the valid key code data 111.

If the user-provided key code does not match the valid key code, then the MPGS logic 106 transmits a rejection notification to the MPG engine 114, and the MPG engine 114 does not allow the selected music to be used by the MPG logic 112. If the user-provided key code matches the valid key code in the key code data 111, then the MPGS logic 106 transmits an acceptance notification to the MPG engine 114, and the MPG engine 114 allows the selected music to be used by the MPG logic 112. Additionally, the game engine 114 may designate the authorization of the song for use in the game 112 for future game sessions as well as designating any other songs that are associated with the valid key code (e.g., other songs from the same album or other collections of songs) for use in the game thus eliminating future prompts for the previously provided key code.

If the user 116 is unable to provide a key code that matches the valid key code, the MPG engine 114 can prompt the user 116 to determine if he would like to receive a valid key code for the song that the user 116 has selected for play. If so, the MPG logic 112 and/or the MPG engine 114 can direct the user 116 to an internet site (not shown) or a retailer where the user 116 can purchase, for a fee or otherwise, a copy of the selected music along with the valid key code or just the valid key code.

Thus, the system 100 serves to discourage the unlawful use of pirated music by encouraging users, e.g., user 116 of the system 100, to obtain valid key codes for music that the user 116 desires to incorporate into the gaming environment. However, the use of key codes, as described hereinabove, is unnecessary and may be left out of at least some embodiments. Such an authentication method is further described with reference to FIGS. 2A–2B.

In one embodiment, the newly acquired music may contain on or with the media, e.g., CD, the music information 108 comparing the music-powered attributes 142 related to the newly purchased music. For example, if the user 116 purchases a CD containing a song for use by the game unit 104, the CD may include, in addition to data defining the song, data defining various music-powered attributes, as described herein. Therefore, when the user 116 loads the newly purchased music into the game unit 104, the MPG engine 114 and the MPG logic 112 can retrieve the music-powered attributes corresponding to the newly purchased music from the purchased media (e.g., CD) unless updates have been released since the CD was pressed.

Furthermore, music may be delivered to the user 116 along with a game (e.g., MPG logic 112) that was developed to interface with the MPG engine 114. In this regard, in at least some embodiments, the MPG logic 112 may be contained in a cartridge or on a CD that is removable from the game unit 104. Such a cartridge or CD may include data defining not only the game logic 112 but also defining music and/or music-powered attributes to be used in the gaming environment controlled by the MPG logic 112. Moreover, different types of logic 112 defining different types of video games may be interfaced with and run on the game unit 104. For example, one cartridge or CD may include logic 112 for providing a virtual nightclub game, whereas another cartridge or CD may include logic 112 for providing a virtual auto racing game. In such embodiments, the MPG engine 114 is responsible for maintaining or managing data defining music and/or music-powered attributes, and each set of MPG logic 112 determines how such music-powered attributes are to be used in its respective gaming environment.

Figure 8:
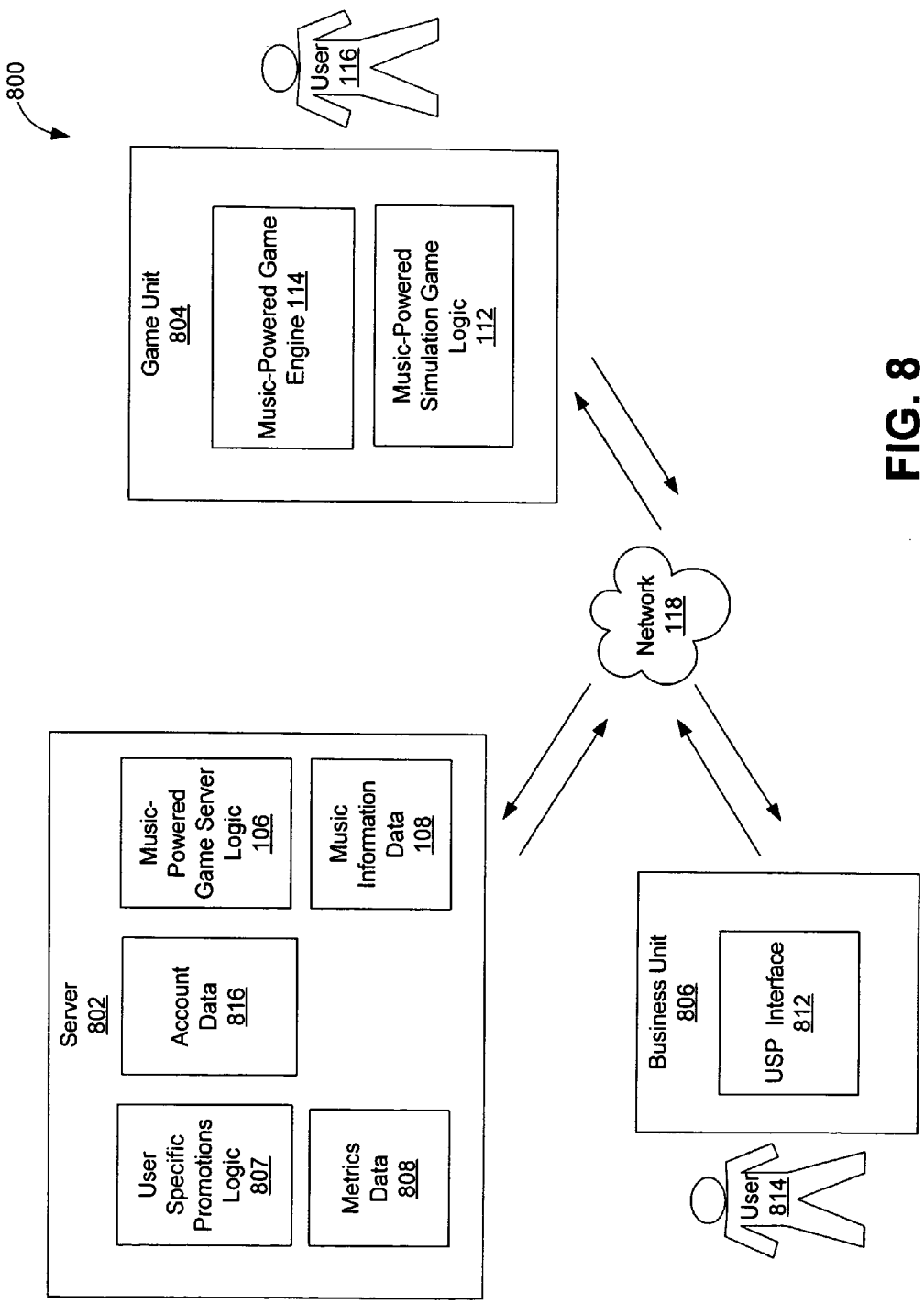
FIG. 8 is a block diagram of a gaming system in accordance with an exemplary embodiment of the present disclosure.

Additionally, the MPGS logic 106 can track and report music and use preferences of the user 116, described further herein with reference to FIG. 8. Generally, the MPG engine 114 provides information to the MPGS logic 106 corresponding to the type of music acquired by the user 116 (e.g., interfaced with the game unit 104 by the user 116) and the frequency that the user 116 selects specific songs or particular types of music for use in the gaming environment provided by the MPG logic 112. Other types of user music and use preferences may be tracked and reported in other embodiments. The MPGS logic 106 can store the reported information on the server for subsequent access and use for marketing or advertising purposes, such as is described hereafter with reference to FIG. 8.

In one embodiment, the MPGS logic 106 supports the industry's popular Digital Rights Management (DRM) standards. In this regard, the system 100 abides by the limitations specified for a particular song regarding the number of times that a song that has been downloaded can be played.

In addition, a music selection, for example one made by a music label that is promoting a particular album and/or song on the album, may provide "promotional attributes," which are also included in the music-powered attributes 142, associated with the song and/or album that indicate that the song or album is only licensed for a specified number of times. The MPG engine 114 may be configured to ensure that the song or album is not played more than the specified number of times in the gaming environment. Furthermore, the attributes corresponding to a promotional song that is being promoted may also prompt the MPG engine 114 to disable fast forward and/or skipping functionality provided to an end user 116. In this regard, the user 116 may be required to listen to the complete promotional song provided by the retailer, as opposed to listening to only a portion of the song provided.

The MPG engine 114 further facilitates user registration. In this regard, before the MPGS logic 106 sends music information 108 or game content data 107 to the user's game unit 104, the MPGS logic 106 can first request that the user 116 register with the server 102 by sending, to the server 102, various personal information about the user 116 and/or game unit 104. In particular, when a new user 116 registers with the MPGS logic 106, the MPG engine 114 may be configured to request registration information about the user 116, such as the user's zip code, name, address, music likes/dislikes, gender, favorite bands, favorite retailers for purchasing music, and the like. The user 116 may then enter the requested registration information through a graphical user interface provided by the MPG engine 114. The MPG engine 114 transmits the registration information to the MPGS logic 106 on the server 102, and the MPGS logic 106 stores the user registration information 105 on the server 102.

Furthermore, the MPG engine 114 can modify registration information of a user 116. In this regard, the MPG engine 114 may periodically request that the user 116 update his registration information.

In operation generally, the user 116, or another source as indicated herein, provides one or more inputs to initiate the MPG logic 112 at the game unit 104. Upon initiation, the MPG logic 112 provides an interactive gaming environment, an example of which is illustrated and described in more detail with reference to FIG. 5.

The MPG logic 112 enables the user 116 to interactively play in the gaming environment. During play, the MPG engine 114 and the MPG logic 112 work in conjunction to select, initialize, create, modify, and/or control events that occur during game play, the features and/or behaviors of video game objects, including objects representative of characters or inanimate objects, within the game, and/or the general look and feel of the gaming environment in accordance with music-powered attributes of selected music.

Note that music selection inputs may be received by the game unit 104 from the user 116, from the server 102, or from other sources. In this regard, the MPG engine 114 receives a music selection (e.g., a selection identifying a song or a group of songs to be included in a playlist and incorporated into the gaming environment) from the user 116 via the MPG logic 112, or another source as indicated herein. The MPG engine 114 associates the music selected with its various music-powered attributes, which are described in detail hereafter, and the MPG logic 112 uses the associated music-powered attributes to affect game play. The MPG engine 114 communicates the associated music-powered attributes to the MPG logic 112, and the MPG logic 112 uses the attributes corresponding to the selected music to affect the gaming environment.

Figure 2A:
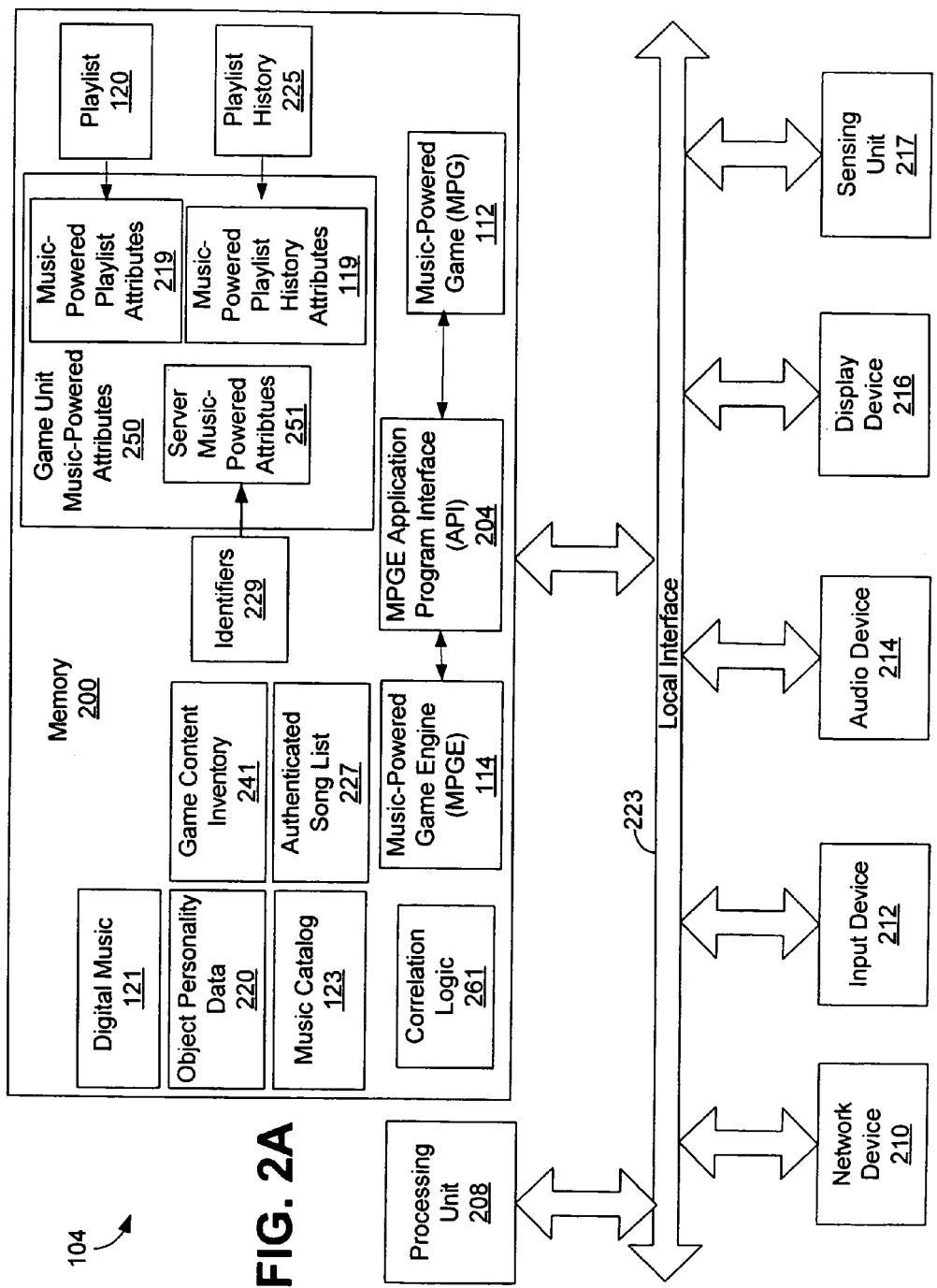
FIG. 2A is a block diagram illustrating an exemplary game unit of the system illustrated in FIG. 1.

FIG. 2A depicts an exemplary game unit 104 of the present disclosure. The exemplary game unit 104 generally comprises a processing unit 208 and memory 200.

Memory 200 comprises data representative of game content inventory 241, a playlist 120, digital music 121, an authenticated song list 227, a music catalog 123, object personality data 220, and a playlist history 225, and each of these components and their functionality are described further herein. Further, the memory 200 comprises game unit music-powered attributes 250, the MPG engine 114, the MPG logic 112, and an MPG application program interface (API) 204.

The game unit music-powered attributes 250 generally comprise a collection of music-powered attributes 250 that includes server music-powered attributes 251, which is preferably a selected portion of the music-powered attributes 142 from the server 102 corresponding to the music played on the particular game unit 104. Additionally, the game unit music-powered attributes 250 include music-powered playlist attributes 219 and music-powered playlist history attributes 119.

The processing unit 208 may be a digital processor or other type of circuitry configured to run the MPG logic 112 and the MPG engine 114, as well as other software, by processing and executing the instructions of the MPG logic 112 and the MPG engine 114. The processing unit 208 communicates to and drives the other elements within the unit 104 via a local interface 222, which can include one or more buses.

Figure 5:
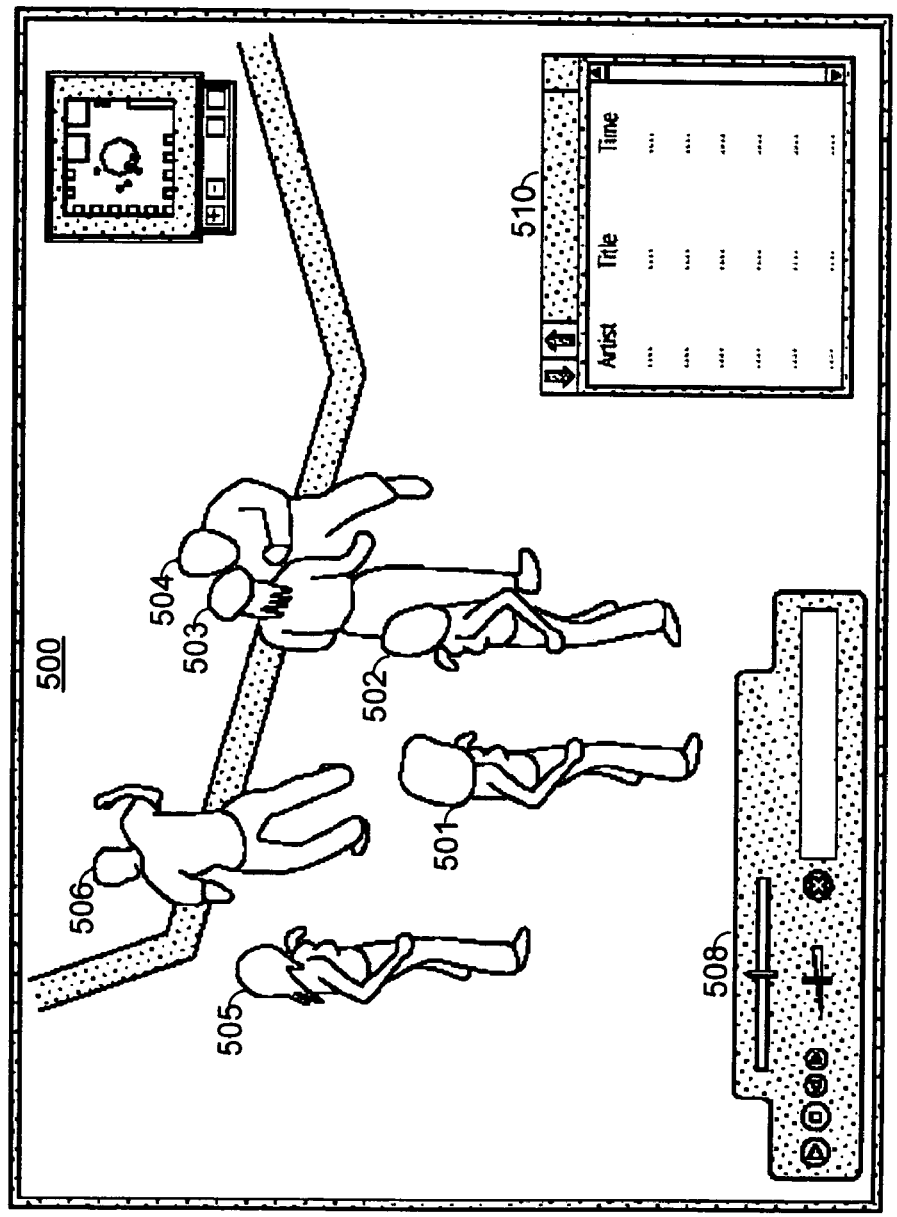
FIG. 5 is an exemplary display of a gaming environment defined by the gaming unit illustrated in FIG. 2.

Furthermore, an input device 212, for example, a keyboard, a switch, a mouse, and/or other type of interface, can be used to input data (e.g., song selection inputs) from a user 116 (FIG. 1) of the game unit 104, and display device 216, such as a monitor or television, can be used to display data to the user 116. For example, the display device 216 can display a graphical gaming environment to the user 116, an example of which is illustrated in FIG. 5 and described in more detail hereafter. Examples of input devices may include, but are not limited to, a keyboard device, serial port, scanner, camera, microphone, card reader, and/or network connection.

Additionally, the exemplary game unit 104 comprises an audio device 214 connected to the local interface 223, which may comprise one or more buses. In the exemplary game unit 104, the audio device 214, e.g., a speaker, preferably plays songs listed in the playlist of the MPG logic 212 sequentially during play of the game.

The game unit 104 can be connected to the network 118 (FIG. 1) via a network device 210 that allows the unit 104 to exchange data with the network 118 (FIG. 1). In this regard, the game unit 104 receives music information 108 from the server 102, via the network 118.

In an alternate embodiment, the network device 210 receives music from a streaming server (not shown). A streaming server is a computing device that transmits a stream of data representative of a single song, a portion of a song, a collection of songs, e.g., an entire album, or portions of a radio program, as described in detail with reference to FIG. 11, for example, to the game unit 104 over the network 118. Examples of streaming media systems include the streaming tools for Windows Media or QuickTime. Prior to transmittal, the streaming server compresses the data, and upon delivery, the data is decompressed for use by the gaming system.

The MPG engine 114, the application program interface (API) 204, and the MPG logic 112 work in conjunction to provide a music-powered gaming environment to a user 116 (FIG. 1). The MPG engine 114, the application program interface (API) 204, and the MPG logic 112 are shown as implemented in software and stored in memory 202. However, each may be implemented in hardware or a combination of hardware and software in other embodiments. Note that the MPG engine 114 comprises logic for implementing its functionality, as described herein. Further, as used herein, the term "logic," refers to components that generally may be implemented in hardware, software, or a combination thereof, unless otherwise noted herein.

As noted herein, the MPG engine 114, the MPG API 204, and the MPG logic 112 are shown in FIG. 2A as software stored in memory 200. When stored in memory 200, each can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. Note that the computer-readable medium could even be paper or another suitable medium upon which a program is printed, as the program can be electronically captured, via for instance optical scanning of the paper or other medium, then compiled, interpreted or otherwise processed in a suitable manner if necessary, and then stored in a computer memory.

The API 204 comprises defined code that interfaces the MPG logic 112 with the MPG engine 114. In this regard, the API 204 provides a programmer with, for example, specific calls to operations of the MPG engine 114 that cause the MPG engine 114 to perform predefined functions, such as for example, adding or deleting songs from playlist 120 or providing the playlist 120 to the logic 112 so that the songs indicated by the playlist will be incorporated into the gaming environment. The integration of music information 108 (FIG. 1) into the gaming environment is described in more detail with reference to FIGS. 3–5.

More particularly, the API 204 may be defined at a high code level and provide a level of abstraction between the MPG logic 112 and the MPG engine 114 by which a programmer can create source code integrating API commands for controlling the MPG engine 114 so that the game is music-powered, as described herein. The API 204 provides the interface between a high level language, for example, "C" or "C++", in which the MPG logic 112 is written, and the lower level utilities and services which can be written without necessarily considering the calling conventions supported by a compiled language.

In operation, the MPG logic 112 provides the user 116 a gaming environment. For example, the gaming environment may be a virtual nightclub or war zone. Note that the gaming environment is preferably displayed within a graphical user interface (GUI), and an example of a gaming environment GUI is described in more detail with reference to FIG. 5.

A user 116 (FIG. 1) initiates the MPG logic 112 via the input device 212. The MPG logic 112 displays via the display device 216 the particular gaming-environment, and the game begins. The MPG logic 112 may initiate with a default playlist to start the user 116 in the game. The default playlist can be provided, for example, along with the data defining the MPG logic 112.

The MPG engine 114 uses the playlist 120 in order to determine the initial gaming environment. For example, if the genre of the first song is country, then the MPG engine 114 may be configured to provide country-like game content to the MPG logic 112. Furthermore, the MPG engine 114 may use the playlist history 225 as the default playlist in order to create the gaming environment, as will be described further hereinafter.

The user 116 can add, delete, or shuffle songs within the playlist 120 during operation, and the addition and/or deletion from the playlist can affect the game play by changing the content or order of the songs being played. In one embodiment, the theme of each song in the playlist 120 is measured by type and magnitude to create a playlist theme rating that is the combined effect of each theme on the playlist 120. This playlist theme rating can then be used to initialize objects and events. For example, if the playlist is made up of 80% love themes, 10% violence, and 10% social commentary, then the game engine 114 may initialize 80% of the characters with love traits and 80% of the game events to be love-based and likewise for the violence and social commentary themes.

In addition, the order of the playlist 120 can be significant in affecting the gaming environment. In this regard, music-powered song attributes 250 of a previous song can modify a character's present state. Therefore, with respect to the character's reaction to the current song, the character may react to the current song based upon the character's state, which may be affected by the previously played song or songs. Shuffling the order of the playlist 120 and playing the MPG logic 112 again, may produce a different state for the character and a different set of actions, reactions and/or interactions to the currently playing song.

Additionally, the MPG engine 114 may save the playlist 120 for future use even after the current run of the game has ended, which the MPG engine 114 may store as playlist history 225, as described further herein.

The MPG logic 112, in accordance with the type of gaming environment created, controls a plurality of video game objects, which may consist of, for example, characters (e.g., people or aliens), tanks, roller coasters, pets, and the like, as well as aggregate objects, such as those typically used in tycoon games, and other abstract video game elements including, but not limited to, landing squares on a board game, cards, in a card game, dice in a dice game, or questions in a quiz game. These are only exemplary video game objects, other video game objects can be used in other embodiments. Associated with a of the plurality of video game objects is object personality data 220 that defines, describes, and otherwise is used by the MPG logic 112 to determine how the objects will react to music and/or sounds.

During operation, the game unit 104 receives song selections identifying songs to be played in the gaming environment provided by the MPG logic 112. The MPG engine 114 stores data indicative of the music selection inputs in the playlist 120. As described herein, the playlist 120 can be a list of song identifiers for songs that the MPG engine 114 plays during the game controlled by the MPG logic 112. The playlist 120 may include the data defining such songs, although such data may be stored elsewhere. Hereafter, unless otherwise noted, it will be assumed that the playlist 120 comprises a list of song identifiers and that data defining these songs is stored in memory as digital music 121.

The MPG engine 114 can play music from locally stored digital music 121, for example a song file in MP3 format. Thus, the MPG engine 114 transmits a song, as indicated in the playlist 120, from stored digital music 121 to the audio device 214. In addition to transmitting audio signals indicative of the selected song to the audio device 214, the MPG engine 114 transmits the game unit music-powered attributes 250, including those server music-powered attributes 251 specifically associated with the selected song, which can include song attributes, album attributes, and/or artist attributes, among others, to the MPG logic 112. As noted hereinabove, the server music-powered attributes 251 are retrieved from the server 102, and are preferably a portion of the server music-powered attributes 142 on the server 102. However, the game unit music-powered attributes 250 may also comprise music-powered attributes retrieved from a CD, a stream of data, digital broadcast data, described further hereinafter.

In this regard, the MPG engine 114, as described above, maintains server music-powered attributes 251 associated with songs, albums, and/or artists that can be played by the MPG engine 114. The server music-powered attributes 251 are preferably populated by the MPGS logic 106. In this regard, the MPGS logic 106 downloads music-powered attributes 142 to the MPG engine 114 corresponding to music for which the MPG engine 114 receives music selection inputs either from the user 116 or another source. In any event, the music-powered attributes 142 associated with selected digital songs 121 and the identifier 143 associated with the selected songs are stored on the game unit 104 in server music-powered attributes 251 and identifier 229, respectively.

Additionally, music-powered attributes 142 or the game content data 107 that was originally distributed on a CD may be modified after distribution of the CD. The MPG engine 114 may update the server music-powered attributes 251 on the game unit 104 and the game content inventory 241 on the game unit 104 when such music-powered attributes 142 are updated. In so updating, the MPG engine compares the versions of the music-powered attributes 251 with the corresponding music-powered attributes 142 on the server 102 and updates those music-powered attributes 250 accordingly.

As an example, a song obtained from a CD may become a hit that was not expected, so it may be desirable to increase the song's hit rating, as indicated by its associated music-powered attributes. There may be a dance rating attribute associated with a song that describes to what extent a song can be danced. After release of the CD, a particular song becomes a favorite within dance clubs, so it may be desirable to increase the song's dance rating. A song may become associated with an unforeseen theme such as a song becoming popular in the gay community, being played at sporting events, or used on a political campaign, and the song's associated music-powered attributes may be modified to better reflect the song's overall market use by updating its themes and updating its hit rating to reflect its newly found popularity. The music-powered attributes 142 may be updated for a song that subsequently is associated with real world events, and events in the game can be tied to the real world events.

For example, if after a CD is distributed, a song becomes strongly linked to some new dance move, such as the well-known song "YMCA," with its hand moves or "Macarena" with its arm/body moves, then the event values for the song can be updated for character motion files, and the song attributes can be classified with time stamps for their proper synchronization with the music. Other songs may become associated with events that are not synchronized with the music. For example if during a tour, an artist "sets their guitar on fire" during a song as Jimmy Hendrix became noted for, or "distributes scarves" as Elvis did, or has "panties thrown up on stage" as Tom Jones did, or "has fans scream at unheard of levels" as The Beatles did, then and event would be updated for the song that would trigger new world events or increase the likelihood of existing events occurring such as a speaker catching on fire, characters waving scarves, panties being found on the dance floor or patrons screaming respectively.

Before a song is played, as indicated by the playlist 120, the MPG engine 114 retrieves the music-powered attributes associated with the song from the server music-powered attributes 251 and provides such music-powered attributes 251 to the MPG logic 112. In this regard, the MPG engine 114 identifies the song that is to be played, searches the identifiers 229 associated with the songs by use of, for example, the title and artist, and retrieves the song's music-powered attributes 251. Note that the identifiers 229 preferably provide an index to the music-powered attributes 251.

In accordance with the manner in which the MPG logic 112 has been configured to use the game unit music-powered attributes 250 in relation to its game objects, the game play proceeds and events, objects, and the look and feel of the game are affected in accordance with the provided game unit music-powered attributes 250. An exemplary gaming environment is described in detail with reference to FIG. 5.

As described herein with reference to FIG. 1, the server 102 can maintain key code data 111 (FIG. 1) that comprises key codes associated with legitimately acquired music. Likewise, the MPG engine 114 can maintain a current listing of the authenticated song within data 227 stored in memory 200. Thus, when the user 116 attempts to use a new song in the gaming environment, the MPG engine 114 can ensure that the newly requested song has been authenticated, i.e., the user 116 is associated with a legitimate key code 111 on the server 102 with respect to the song, by searching the authenticated song data 227. In this regard, if the user 116 purchased the song legitimately, then the MPG engine 114 stores an identifier in the authenticated song data 227 indicating that the particular song can be played by the MPG engine 114. Thus, if the identifier of a particular song is listed in the authenticated song data 227, then the engine 114 is authorized to interface the song with the MPG logic 112 so that it can be incorporated into the gaming environment. Authentication is described in more detail with reference to FIG. 2B.

Further, the MPG engine 114 can create a catalog 123 that comprises a complete listing of songs currently available for play by the game unit 104. Notably, music available to the MPG engine 114 for play in the gaming environment created by the MPG logic 112 can be obtained in a variety of ways. For example, music can be loaded onto the game unit 102 via a CD or downloaded from an internet site, such as, for example, as an MP3 file. The MPG engine 114 can search fixed and removable storage on the game unit 104, such as the unit's hard drive, CD drive, or DVD drive, for music that is in a format compatible to the MPG engine 114. When the MPG engine 114 locates music in a compatible format, the MPG engine 114 can enter the located music into the catalog 123 and retrieve the music-powered attributes associated with the located song from the MPGS logic 106 on the server 102. The MPG engine 114 can then store the located music's associated music-powered attributes 142 in the server music-powered attributes 251 of the game unit music-powered attributes 250 for retrieval during game play.

If the user 116 is the source providing the music selection inputs, the MPG logic 112 can display the catalog 123 to the user 116. The user 116 can then make a selection from the displayed catalog 123. When the user 116 selects a new song from the catalog 123, the MPG engine 114 creates or updates the playlist 120 to reflect the music selection inputs and during game play provides the server music-powered attributes 251 corresponding to the songs selected from the catalog 123.

When the MPG engine 114 retains historical information regarding the playlist 120 of the user 116 from past runs of the game, the MPG engine 114 can extract information from the playlist history 225 for future game play. Such information can be stored locally in memory 200 so that the MPG engine 114 can access the information directly, or the information can be transmitted to the MPGS logic 106 on the server 102 for storage remotely.

In one embodiment, the MPG engine 114 maintains the playlist history attributes 119 that define and/or describe the playlist history 225. The playlist history attributes 119 can compile and characterize various music-powered attributes, such as for example, an attribute associated with songs recently played, an attributes associated with the frequency that a particular song is played, an attributes associated with the frequency that songs corresponding to a particular genre are played, and the like.

The MPG engine 114 and the MPG logic 112 use the playlist history attributes 119 to affect game play. For example, if a particular song associated with "love" is played repeatedly, then the MPG logic 112 can use this information to affect the behavior of, for example, the attitudes of the character objects in the game. In particular, if the love song that is played over and over is slow and downbeat, over time, the characters may begin to appear bored and listless. If, however, a song about "violence" is played over and over, the characters may begin to perform violent acts, for example, fighting, throwing things, arguing, etc.

Furthermore, the MPG engine 114 may use the playlist history 225 in order to modify the object personality data 220. As described herein, the playlist history 225 comprises a list of songs indicative of songs that have historically been played by the MPG engine 114 by selection by the user 116 or otherwise. In addition to the list of song's, the playlist history is associated with the playlist history attributes 119 in the game unit music-powered attributes 250. The playlist history attributes 119 provides attributes that define, describe, or otherwise categorize the playlist history 225 so that the playlist history 225 can affect the game play through the playlist history attributes 119.

Thus, assume that a character object "Bill" is in the game and that Bill's personality data 220 indicates that he enjoys chewing bubble gum. Thus, each time that Bill appears in the gaming environment, Bill is controlled, based on his personality data 220, such that he appears to be chewing bubble gum. However, the user 116, or any other source as described herein, may repeatedly select music associated with barbecue, as indicated by the playlist history attributes 119. Over time, the MPG engine 114, based on the selections of music classified on the playlist history attributes 119 associated with barbecue, can modify Bill's personality data 220 from enjoying bubble gum to preferring barbecue.

In another example, if the user 116 has historically selected a particular genre music, then the playlist history attributes 119 collected from the playlist history 225 that the MPG engine 114 transmits to the MPG logic 112 can be associated with the particular genre of music.

As an illustration, assume the user 116 has frequently selected country music for play in the gaming environment. In such an example, the MPG logic 112 stores such information in the playlist history attributes 119 and utilizes the playlist history attributes 119 associated with the country songs to create a country-like gaming environment. For example, the MPG engine 114 may automatically provide game parameters defining a country bar, e.g., various patrons wear cowboy hats or there may be a mechanical bull in the country-like bar. However, if the user 116 has frequently selected disco music, the MPG engine 114 may automatically define a disco-like bar in accordance with the playlist history attributes 119, e.g., various patrons may be dressed in 1970's type of attire.

As the game is played, the behaviors of the objects and/or characters, for example patrons at a nightclub, events that occur within the nightclub, and/or the look and feel of the nightclub behave, occur, and evolve in accordance with the game unit music-powered attributes 250 relating to the music being played during the game play and the objects' and/or character's personality data.

The MPG logic 112 can effectuate initialization, modification, creation and/or control of objects, events, and/or the look and feel of the gaming environment by associating particular game unit music-powered attributes 251, playlist attributes 219, and playlist history attributes 119 with the object personality data 220.

Notably, an objects personality data 220 is a collection of data that defines the objects behavioral traits, physical appearance, features, and the like. For example, if a country song (as indicated by the song's music-powered attributes) is selected and an object's, for example, an object's personality data indicates that he has an extraordinary distaste for country music, then the action of the character may be controlled in response to the song to reflect this. As an example, the action of the character may be automatically controlled by the MPG logic 112 such that the character appears to become more agitated or less friendly while the song is playing. As a further example, the character may be controlled such that he throws a beer bottle against the wall or stops dancing in response to the play of a country song.

The MPG logic 112 can use a script, as described hereinabove, to define objects with a standard set of behavior traits such as "like," "dislike," "hate," "defend," or "promote." Additionally, the script can define how these behavior traits are performed independent of the actual items that are "liked, disliked, hated, defended, or promoted."

The system 100 enables the MPG logic 112 to extract the music-powered attributes 250 and bind them at load-time or run-time to the object personality data 220 of particular objects. Thus, MPG logic 112 can initialize, modify, create and/or control events, objects, and/or look and feel in the game each time the new music is selected. Using the system 100, the MPG logic 112 can bind the music-powered attributes 250 to the object personality data 220 corresponding to a predefined and limited set of songs at the time the MPG logic 112 is implemented. In this regard, the MPG logic 112 may not rely on load-time or run-time additions of new music. Further, the MPG logic 112 can be configured to bind music-powered attributes 250 and the personality data 220 with respect to any music within the system 100, realizing all songs in the system have music-powered attributes 250 at load-time or run-time.

However, if the character's personality data indicates that the character likes country music, then the character may be automatically controlled by the logic 112 such that it appears that he becomes less agitated or more friendly during the song. For example, the character may be controlled such that he begins to dance to the beat of the song being played. Other types of object personality data and the affects of the music-powered attributes on the events, the objects, and/or the look and feel of the gaming environment are possible in other examples.

Additionally, the MPG engine 114 may further facilitate changes in features of the gaming environment in accordance with the game unit music-powered attributes 250. For example, if a country music song is playing or is selected via the input device 212, the MPG engine 114 may transmit game content inventory 241 and music-powered attributes to the MPG logic 112 that facilitates the addition of wall art corresponding to country music songs, e.g., there may appear in the gaming environment a wall poster of a country music artist, such as George Strait, or an animated character representative of the artist might appear and possibly perform a song in the gaming environment.

In one embodiment, the gaming environment can be artist centric. In such an embodiment, if the user 116 purchases a particular artist's music, then the CD purchased comprises game content inventory 141 specifically corresponding to the artist, the artist's music, and music-powered attributes associated with the music. Therefore, when the user 116 loads the music and corresponding information into the game unit, the MPG engine 114 and the MPG logic 112 use the new game content inventory 141 and the game unit music-powered attributes 250 to customize the user's gaming environment to be centered around the artist.

For example, if a user 116 loads a Britney Spears CD into the game unit 104, MPG engine 114 loads the new game content inventory 141. The game content inventory 141 may comprise a plurality of music-powered attributes associated with the new CD. The game content may comprise data defining art similar to that exhibited on the most recent label of the Britney's CD, including the color scheme. The music-powered attributes descriptive of the artist centric gaming environment may further comprise music-powered attributes associated with the lifestyle and/or current events in the artist's life. Additionally, the game content 107 delivered to the game unit 104 may comprise a new character representative of the artist, as described herein. Along with the new character are the character's associated music-powered attributes.

Thus, after receiving the new game content inventory 241 and server music-powered attributes 251, the MPG engine 114 loads the received music-powered attributes 251 into the MPG logic 112. In this regard, the MPG engine 112 adds objects and/or modifies current objects and/or initiates events in accordance with the music-powered attributes 251 and the game content inventory 241. For example, the nightclub may be "Club Britney," which is decorated in the same colors of those on her newest album.

Furthermore, once the user 116 loads the artist centric gaming environment via the CD or otherwise, the MPG engine 114 can notify the MPGS logic 106 that the user 116 now has an artist centric gaming environment. The MPGS logic 106 can store such notification. Thus, when the MPGS logic 106 receives an update or new game content that pertains to the related artist, either through a record label, gamers, games designers, or the like, the MPGS logic 106 can automatically provide, based on the stored notification, the update or new game content to game unit 104 for incorporation into the artist centric gaming environment.

In addition to enabling a user 116 to create a character having a defined personality, as described herein. The MPG logic 112 may also provide the user 116 with an "empty" character, i.e., one whose personality is not at all or fully defined.

The music selection inputs provided by the user 116 or otherwise can be used by the MPG engine 114 to dynamically create the "empty" character's personality. As the music is selected for the playlist and/or played, the personality of the character is defined and changes. For example, if country-like music is selected, the object personality data 220 may be defined such that character becomes more country-like. As a further example, the character's affinity toward country music, as indicated by its associated object personality data, may be increased. Alternatively, the character's object personality data may be saved and used in future games.

As described herein, the MPG logic 112 in conjunction with the MPG engine 114 provides an interactive gaming environment. In this regard, the MPG engine 114 receives music selection inputs indicating which music is to be played in the gaming environment. The MPG engine 114 retrieves a portion of the server music-powered attributes 142 (FIG. 1) associated with the music selected by such inputs. The MPG logic 112 stores such selected portion of music-powered attributes 251 on the game unit 104, and thereafter the music-powered attributes 251 are available to the MPG logic 112 to initialize, modify, create and/or control events, objects, and/or look and feel in the game. In addition, the MPG logic 112 may enable a user 116 to select gaming environment parameters in order to customize the gaming environment created by the MPG logic 112.

In one embodiment, the user 116 customizes the gaming environment when the MPG logic 112 initializes during setup, although customization of the gaming environment may occur at other times. In customizing the gaming environment, the user 116 may select graphic settings, network options, and controls, the user's avatar, i.e., an iconic representation of the user 116, and select other specialized gaming environment parameters. For example, if the simulation provided by the MPG logic 112 pertains to a nightclub, the MPG logic 112 can enable the user 116 to simulate purchasing the nightclub and selecting personnel staff.

In one embodiment of the system 100 (FIG. 1), the MPG engine 114 and the MPG logic 112 enable the user 116 to create his/her own personal events, objects, including characters and/or inanimate objects, and look and feel. In this regard, the MPG logic 112 displays a GUI via the display device 216 that preferably exhibits a character personality template with no values associated with various personality data. The personality template comprises a plurality of data identifiers and corresponding text fields in which the user 116 can enter magnitudes for customized personality traits or otherwise define such traits.

The MPG logic 112 saves the new personality template in the object personality data 220, such that the MPG engine 114 can retrieve the data and provide it to the MPG logic 112 for game play.

Figure 4:
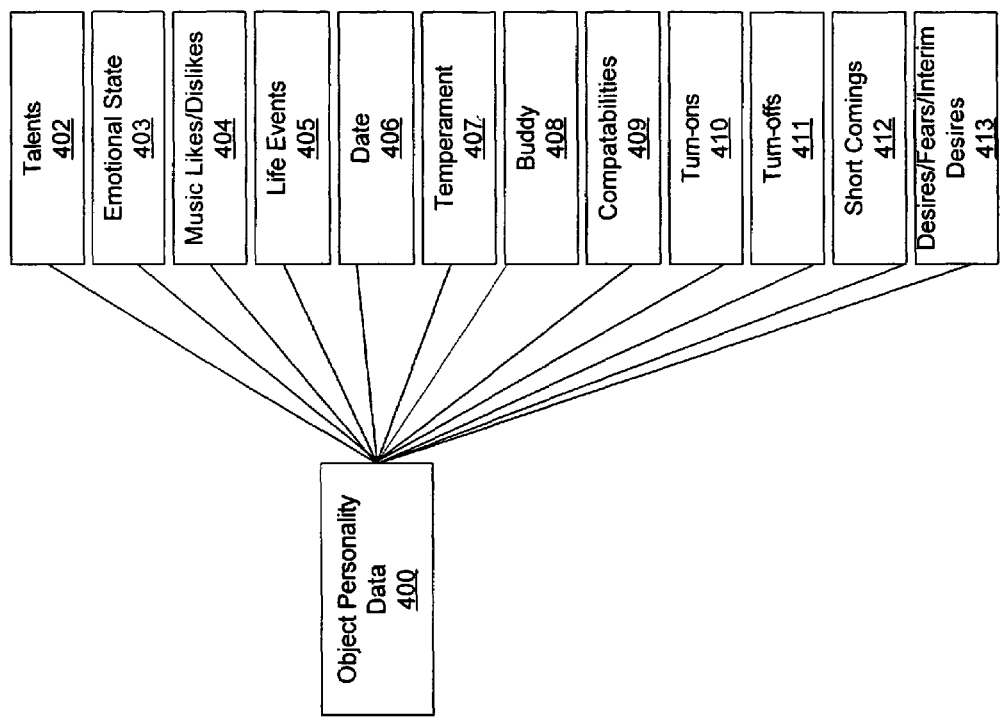
FIG. 4 is a data diagram illustrating an exemplary template for object personality data associated with an artificial intelligence (AI) personality incorporated into the game unit illustrated in FIG. 2.

Furthermore, the MPG engine 114 can transmit the newly created character and associated data to the MPGS logic 106. The MPGS logic 106 can store the information corresponding to the newly created character in the game content data 107. Thereafter, the MPGS logic 106 can offer the user-created game content to other users (not shown) that have similar game units 104 (FIG. 4).

In another embodiment, the game unit 104 may comprise a sensing unit 217. In such an embodiment, game unit music-powered attributes 250 may comprise attributes created in response to inputs from the sensing unit 217.

For example, the sensing unit 217 may comprise a microphone (not shown). The MPG engine 114 interfaces with the sensing unit 217 and collects audio input from the sensing device 217. The MPG engine 114 identifies a sound, for example a telephone ring, and assigns particular music-powered attributes to the sound. The MPG engine 114 may analyze the sound and automatically assign music-powered attributes to the sound based on such analysis. Alternatively, the MPG 114 may receive user 116 inputs for defining the music-powered attributes to be assigned to the sound.

Thus, an object available to the MPG logic 112 for use in controlling the behavior of the game is the sound identified by a user input device, for example the telephone ring. Note that music-powered attributes associated with the telephone ring may comprise a general reaction attribute, such as frustration and/or disgust. Further, the music-powered attributes may comprise a motion file defining behaviors of the characters in the game, such that all the characters appear to turn and face the user 116 when the telephone ring sound is detected by the sensing unit 217.

Thus, if during game play, the sensing device detects the ring of a phone, then the MPG logic 112 may control the characters of the game such that each character turns toward the user 116 at the display device 216 and behaves as if they are disgusted by the interruption and/or the phone on a virtual bar in the nightclub might ring.

In another embodiment, the MPG engine 114 may be configured to receive audio input, e.g., a song, and automatically classify the song, i.e., assign music-powered attributes to the song. In this regard, the MPG engine 114 can automatically identify a song's tempo, tone, beats, theme, and/or sub-themes. Such identification may be accomplished via any known or future-developed techniques. For example, via voice recognition, the MPG engine 114 can identify the use of particular words in the song, e.g., the word "love." Thus, the MPG engine 114 can use such identification to assign a "love" theme music-powered attribute to the song provided as input. Notably, a song is described merely for exemplary purposes. Other audio inputs may be provided to the MPG engine 114 for classification in other embodiments, for example sound effects and books on tape. Further, such identification can be executed by the MPG engine 114 prior to playing the audio during game play and/or during game play.

In such an embodiment, there is preferably correlation logic 261 that compares data indicative of a plurality of sounds to a sound detected by the sensing device 217. If the correlation logic 261 identifies the sound, e.g., the phone is ringing, the correlation logic 261 alerts the MPG engine 114 that the phone is ringing, and the MPG engine 114 transmits the ringing phone music-powered attributes to the MPG logic 112. The MPG logic 112 controls the events that occur during game play, the features and/or behaviors of video game objects, including objects representative of characters or inanimate objects, within the game, and/or the general look and feel of the gaming environment, accordingly.

In another example, the sensing unit 217 may observe the behavior of the user 116 and assign music-powered attributes to a song or other sound based on such observed behavior. For example, the sensing unit 217 may provide a video image of the user 116 while the user 116 is listening to a particular song being played by the game unit 104 or other device. If the user 116 tends to show a relatively high degree of movement, the engine 114 may assume that the user 116 enjoys the song, and modify or define at least one of the song's music-powered attributes, accordingly.

Additionally, the MPG logic 112 may enable the user 116 to define his/her own set of music-powered attributes 250 for storage on the game unit 104, as well. In this regard, the MPG logic 112 may display to the user 116 via the display device 216 a GUI that receives inputs corresponding to a song's music-powered attributes. Such user 116 may share his/her classifications with other users by providing his/her music powered attributes. A peer-to-peer architecture may be used to share such music powered attributes Also, a user 116 can record and/or composes his/her own music and then classifies his/her the music with music-powered attributes 250. Such classification will allow the user 116 to use the recorded or composed music with the MPG logic 112 during game play. In such an embodiment, the recorded or composed music will preferably not require authentication, as described herein.

The GUI displayed by the MPG logic 112 may comprise a template defining a plurality of music-powered attributes related to a song and corresponding textfields. The user 116 can enter values into the text fields corresponding to the song, thereby customizing the music-powered attributes.

The MPG logic 112 receives the inputs and provides them to the MPG engine 114, which stores the information in the game unit music-powered attributes 250. Thus, when the user 116 selects the song associated with the new music-powered attributes 251, the MPG logic 112 initializes, creates, modifies, and/or controls the events, objects and/or look and feel in accordance with the new music-powered attributes 250.

Figure 2B:
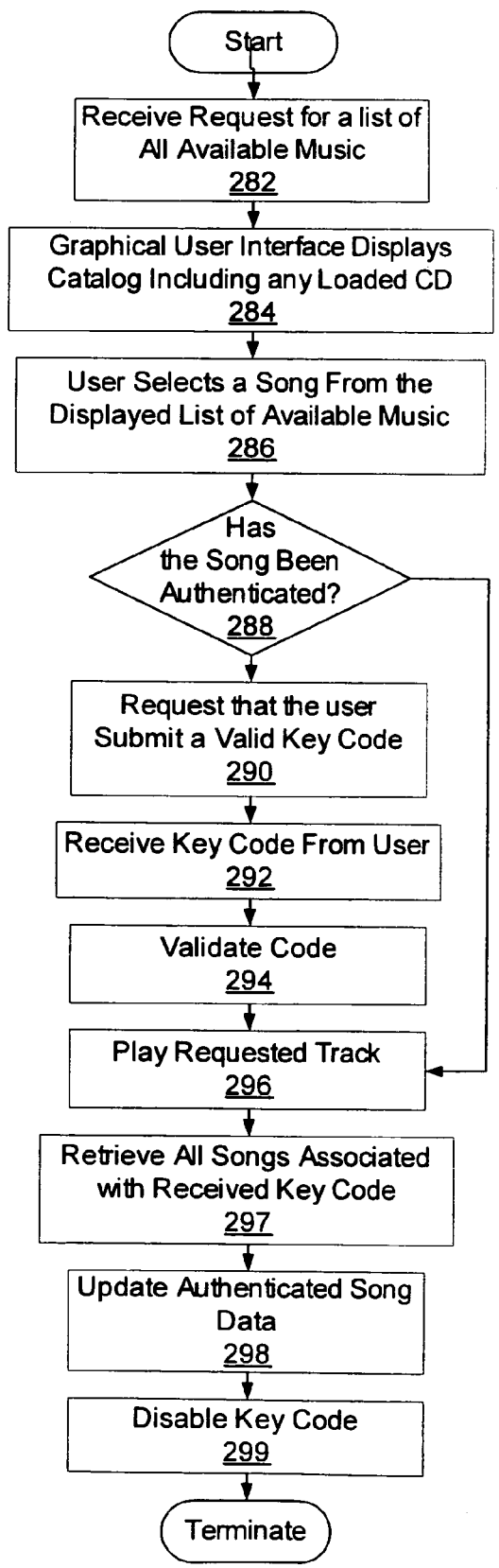
FIG. 2B is a flowchart illustrating exemplary architecture and functionality of the version synchronization of gaming system of FIG. 1.

FIG. 2B is a flowchart illustrating exemplary method of authentication of the system 200 of FIG. 2B.

A user 116 (FIG. 1) inserts a newly purchased CD in a local drive (not shown) of the game unit 104 (FIG. 2B), and the MPG engine 114 (FIG. 2B) receives a request for a list of all available music for play in the MPG logic 112 (FIG. 2B) in step 282 from the user 116 via the MPG logic 112.

The graphical user interface (GUI) of the MPG logic 112 displays a catalog indicative of the list of available music for game play, including any music listed on the CD that may be inserted in the local drive in step 284.

The user 116 selects a song from the catalog, and the selection is a song contained on the newly purchased inserted CD in step 286. If the song has already been authenticated in step 288, then the MPG engine 114 plays the requested song in step 296. The MPG engine 114 may determine whether the song has been authenticated by searching the authenticated songs data 227.

If the song has not been authenticated in step 288, then the MPG engine 114, via the MPG logic 112, requests that the user 116 enter a valid key code in step 290. The MPG engine 114 receives the key code from the user 116 in step 292 and validates the key code in step 294.

The MPG engine 114 can validate the key code by transmitting the key code to the MPGS logic 106 on the server 102. In this regard, the MPGS logic 106 searches the key code data 111 (FIG. 1). If the key code is located in the data 111, then the key code is valid.

The MPG engine 114 then plays the requested song in step 296. Further, the MPG engine 114 requests from the MPGS logic 106 all songs associated with the received key code in step 297. The MPG engine 114 then updates the authenticated song data 227 in step 298. Then MPGS logic 106 disables the key code in the key code data 111 in step 299, so that the key code used by the user 116 is unable to be used by another party illegitimately.

FIG. 3 illustrates an exemplary template 300 that defines exemplary music-powered song attributes of a song 300. In this regard, each song in the playlist 120 (FIG. 2) is associated with a plurality of music-powered attributes that serve to describe and define details about the song. These music-powered attributes can be used by the MPG logic 112 during game play in order to initialize and/or modify the gaming environment provided by such MPG logic 112. In this regard, the MPG logic 112 uses the music-powered attributes to select, initialize, create, modify, and/or control the events that occur during game play, the features and/or behaviors of video game objects, including objects representative of characters or inanimate objects, within the game, and/or the general look and feel of the gaming environment.

The template 300 illustrates mere examples of music-powered song attributes that can be associated with a song. Other music-powered song attributes are possible in other embodiments. The exemplary music-powered song attributes in FIG. 3 include genre 302, tempo 304, theme 306, sub-themes 307, time-stamped events 308, and hit rating 314, and topical lyric attribute 316.

An instantiation of a particular song's genre 302 can include, for example, country, rock-and-roll, hip-hop, reggae, or punk rock. The genre 302 is describes the established class or categorization of the music. Thus, if the current song is a rock-and-roll song, then the characters may don rock-and-roll attire and dance as such. However, if the current song is reggae, then the characters may have corn rolls and wear Jamaican attire. Other examples are possible in other embodiments.

An instantiation of a particular song's tempo 304 can include a description of the beat of the music. The tempo 304 may include, for example, data representative of the beats per minute of the song. Such data is an indication of the speed or rhythm of the song. Thus, a crowd of people at a nightclub may be dancing very slow or not at all if the beat of the song is slow. However, if a subsequent song has a quicker beat, then the patrons may begin to dance faster and livelier.

An instantiation of a particular song's theme 306 can include, for example, love, anger, death, social angst, etc. Thus, if there is a song about love (as indicated by the music-powered song attributes) playing from the playlist 120, then the patrons may behave in accordance with their personalities with respect to love. For example, if there is a patron that recently received a broken heart, according to his personality data, and a love song is played, then he may behave distant and/or sad. If, however, another patron recently fell in love, according to his personality data, that patron may change such that he/she is more affectionate, demonstrative, and/or happy.

An instantiation of a particular song's sub-theme comprises data indicative of a variety sub-themes within the song. For example, if the song's theme is love, then the song may include sub-themes of hugging, hooking-up, meeting the parent, and the like.

An instantiation of a particular song's time-stamped events 308 can include a description of events that occur during the song and each event's associated time interval in the song. Such time-stamped events can be correlated to lyrics in the song or correlated to instantaneous events in the song.

For example, there may be a twenty (20) second interval $T_A$ associated with Event A at time $T_A$ or a ten (10) second interval $T_B$ associated with Event B at time $T_B$. Based on the time-stamps defined by a song's music-powered attributes provided by the MPG engine 114, the MPG logic 112 is able to control the gaming environment according to the time-stamped events. As an example, event A may be a verse about a dog. In such an example, the song attributes indicates when the verse occurs in the song and that the verse is related to a dog. Thus, if there is a character in the nightclub whose personality data indicate that the character's dog recently got ran over by a car, then the character can be automatically controlled to exhibit sad behaviors during the twenty second verse, such as he may sit down or become teary-eyed. Alternatively, the character may get into a fight with a person he thinks ran over his dog. Thus, the game content can react and/or interact with another object based upon the game unit music-powered attributes 250.

As another example, assume that the song selected is "YMCA." The music-powered song attributes for this song may comprise data indicating time intervals corresponding to the chorus of the song. In such an example, the MPG logic 112 may utilize a motion file (not shown) to control graphical objects in the gaming environment. The motion file is a file that defines the motion and/or action to be taken by one or more characters. Therefore, the MPG logic 112, by obtaining the music-powered attributes associated with "YMCA" chorus, can play a motion file defining "YMCA" arm gestures at the time intervals indicated in the music-powered song attributes. Thus, characters may appear to make sequential arm gestures resembling the letters "Y," "M," "C," and "A" when such letters are heard in the song.

The MPG logic 112 can comprise a plurality of motion files. For example, the MPG logic 112 may comprise motion files for walking, talking, chewing gum, fighting, sitting, leaning, and the like. Thus, the MPG logic 112, in association with particular song attributes, can control the motion of the character's in the game. Furthermore, motion files may be associated with music-powered attributes that describe and/or define the motions for a particular object to make. As an example, a music-powered attribute may indicate the popularity of one or more motions defined by the motion file. In this regard, if the motion is a popular motion, then the MPG logic 112 can make all or a significant number of the characters in the gaming environment perform the motion. If it is not so popular, then the MPG logic 112 may make only a select few characters perform the motion.

In another example, musical rests (periods of silence) may be indicated as time-stamped events. One or more characters may be controlled to freeze or stop moving during a musical rest. In another example, characters may be controlled to dance in a particular manner during a particular part of a song. This section of the song may be time-stamped by the song attributes. Further, the song attributes may indicate that type of dancing or motions that are consistent with the time-stamped interval. Other types of time-stamped events may be indicated in other embodiments. Note that, as used herein, a "time-stamp" refers to any type of data that is used to indicate a particular point or interval within a song other type of sound.

An instantiation of a particular song's hit rating 314 can include a value that quantifies the song's hit rating. For example, each song can be rated on a scale from one to ten. In this regard, if the song is a huge hit in the music market, for example based on sales, then the data representative of the status may be ten. If the song has low sales, then the status 314 may be a one. Thus, if the hit rating of a song that is currently being played is ten, the MPG logic 112 may control the characters in the game play to indicate that the song is favored by the characters. In such an example, the characters may be controlled in such a manner as to dance livelier or quicker as the song is being played.

FIG. 4 illustrates an exemplary character personality template 400 that can be used to describe and define a graphical character in the gaming environment. As described herein, each character created or employed by the MPG engine 114 and the MPG logic 112 has associated with it personality data. The MPG logic 112 uses the personality data associated with a character, as well as the song attributes for the song currently being played in order to determine events, actions taken by objects, topics of conversation discussed, and/or current behaviors of the characters. The personality data created for each object can create an artificial intelligence (AI) personality, and this AI personality can be directly related to how the object behaves in response to an external parameter or combinations of external parameters.

The template 400 defines exemplary object personality data corresponding to a character in the gaming environment, including data indicative of the character's talents 402, emotional state 403, music likes/dislikes 404, life events 405, date 406, temperament 407, buddy 408, compatibilities 409, turn-ons 410, turn-offs 411, short comings 412, and desires/fears/interim desires 413. When a character is instantiated by the MPG engine 114, some or all of the data is provided a value or values that describe and define the instantiated character.

In this regard, an instantiation of a particular character may indicate that the character's talents 402 include singing, a foreign language, or art, for example, and a particular character's emotional state 403 may include data indicative of happy, sad, angry, and/or frustrated. Temperament may include extrovert, sensitive, courteous, aggressive, or high-strung. These are specific examples object personality data values as shown in FIG. 4.

There are a variety of ways in which music-powered attributes could affect the objects. For example, the physical traits of the objects can be initialized, modified, created, selected, and/or controlled. Further, a character may evolve as the music-powered attributes affect the gaming environment. For example, the character may become bigger, stronger, "cooler," prettier, and/or taller or shorter. In a war game, weapons may affect each character differently depending on music being played. For example, the weapon may affect the character's strength, stamina, reaction times, shooting accuracy and throwing accuracy.

FIG. 5 illustrates an exemplary gaming environment created by the MPG engine 114 and MPG logic 112. Note that other types of video games can be music-powered, and the present disclosure is not limited to the gaming environment depicted by FIG. 5 and specifically described herein. Embodiments of the present disclosure can comprise other games, such as, for example, a racing games, shooter games, SIM games, or any other video games known or hereafter created In particular, FIG. 5 illustrates a graphical gaming environment 500 of a virtual nightclub, hereinafter referred to as "Club Mojo," comprising a variety of graphical characters including graphical characters 501-507. For brevity, the following game play example is limited to graphical characters Missy 503 and Mike 504.

The Club Mojo 500 further includes a music controller GUI interface 508 and a playlist 510, which lists a plurality of music tracks that will be played sequentially as the game is played. The music controller GUI interface 508 enables a user 116 (FIG. 1) to control the play of the music. In this regard, the interface 508 provides a play button, fast forward button, rewind button, pause button, and a volume control button. Further, as described above, the user 116 is allowed to select the songs included in the playlist 120 (FIG. 2) and may add to or delete from the playlist as play progresses.

When Club Mojo is initiated by a user 116 (FIG. 1), the MPG engine 114 provides the MPG logic 112 with game parameters corresponding to a historical playlist. In this regard, some of the characters in accordance with their associated character personality traits may be more inclined to enjoy hip-hop music. Therefore, the characters that are brought into the gaming environment, if the playlist comprises a significant amount of hip-hop music, may be those that are more inclined to enjoy hip-hop music. Additionally, the graphical elements incorporated into the gaming environment that create the look and feel of Club Mojo may be more geared toward a "hip-hop" look and feel, based on the genre of the songs currently in the playlist. For example, the decorations in the bar may comprise posters of Bling Bling and/or DMX.

As the game begins, the MPG engine 114 provides a variety of game unit music-powered attributes 250, including the playlist 120 and corresponding playlist attributes 219 based on music selection inputs, the server music-powered attributes 251 associated with the music selected, and the playlist history attributes 119. Additionally, the MPG engine 114 transmits game content inventory 241 associated with the various music-powered attributes provided.

The MPG logic 112 then select, initializes, creates, modifies and/or controls the game environment based upon the music-powered attributes 250 received. In this regard, the behavior of the graphical characters 502–507, the events that may occur in the nightclub, and the look and feel of the nightclub, in accordance with the music-powered attributes 250 associated with the currently playing song, are initialized, created, modified, and/or controlled in coordination with the characters' personality data 220.

Thus, the MPG logic 112 may control the motion of the graphical characters 502–507 in accordance with the tempo of the currently playing song. If the tempo of the song is fast-paced, then the motion of the characters consequently may be quicker than if the song had a slower beat. As another example, the music-powered attributes 250 related to a song may cause a particular character's behavior to change to a sad or bored state, which would ultimately result in the walking motion and other similar motions of the character being played more slowly.

Figure 6:
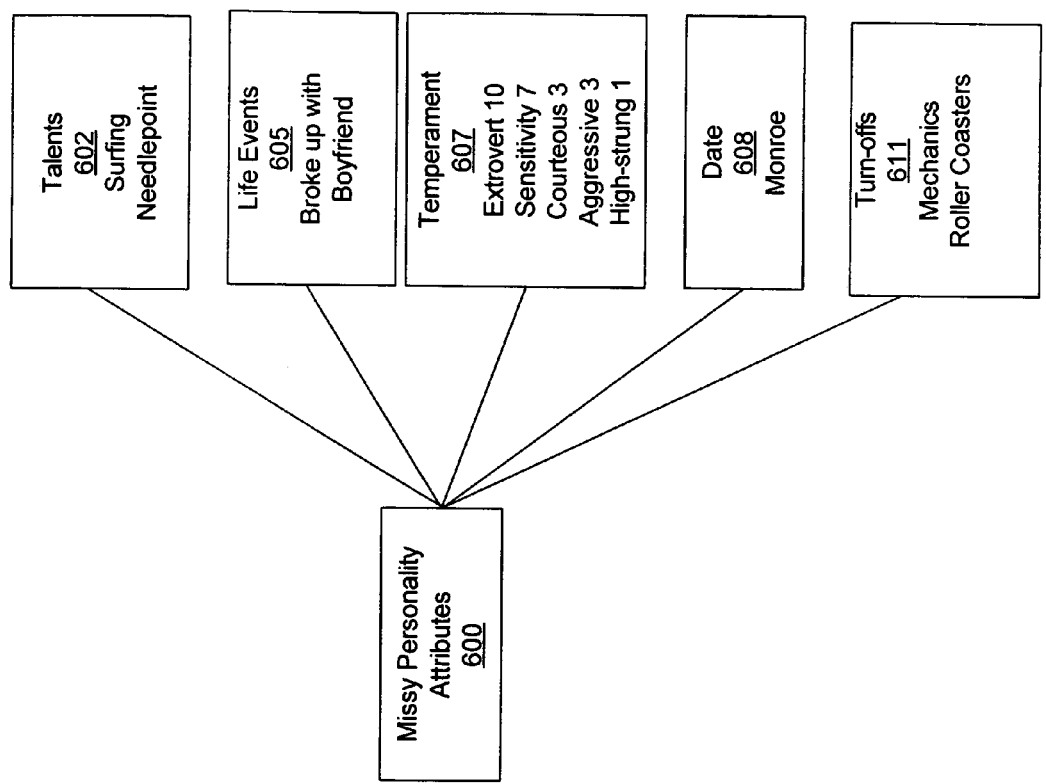
FIG. 6 is a data diagram illustrating exemplary object personality data associated with a character incorporated into the gaming unit illustrated in FIG. 2.
Figure 7:
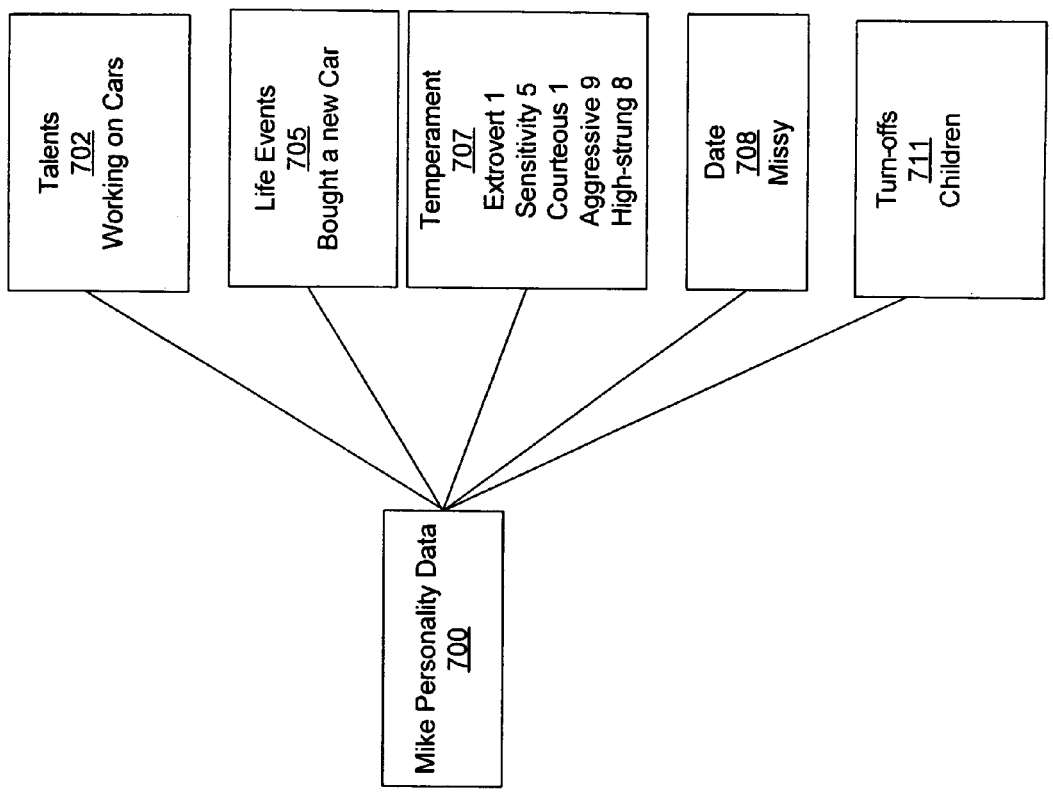
FIG. 7 is a data diagram illustrating exemplary object personality data associated with another character incorporated into the gaming unit illustrated in FIG. 2.

FIG. 6 and FIG. 7 illustrate specific personality data for character Missy 503 and character Mike 504. In this regard, an instantiation of Missy personality data 600 comprises talents 602, which include surfing and needlepoint. Further, her personality data includes a life event 605 indicated as breaking up with her boyfriend. Her temperament data 607 is defined by quantitatively indicating various personality traits on a scale from one to ten, including extrovert 10, sensitivity 7, courteous 3, aggressive 3, and high-strung 1. Her date 608 in the game play is indicated as Mike and her turn-offs data 611 includes mechanics and roller coasters.

Accordingly, an instantiation of Mike personality data 700 comprises talents 602, which include working on cars. Further, his personality data includes a life event 705 indicating that he just bought a new car. His temperament data 607 is defined by quantitatively indicating various personality traits on a scale from one to ten, including extrovert 1, sensitivity 5, courteous 1, aggressive 9, and high-strung 8. His date 708 in the game play is indicated as Missy and his turn-offs data 611 includes children.

In order to provide an example, the reactions of Missy and Mike to the music and to the game play is described in more detail. In this regard, in accordance with each character's personality data, the characters may react to a particular song theme, as indicated by the song's music-powered attributes.

For example, if the currently selected song displayed in the playlist 510 relates to a broken heart, as indicated by the song's correlated music-powered attribute data, then Missy 502, in particular, may behave quite sad, because she recently broke up with her boyfriend, as indicated by Missy's personality data. If the song, however, were related to fast cars, as indicated by the music-powered song attributes, then Mike 504 may behave quite energetic and happy, because he recently purchased a new car, as indicated by Mike's personality data.

Furthermore, during game play, Missy 502 and Mike 504 may spend quite a bit of time chatting, because as indicated in their respective date's personality data 608 and 708, they are presently on a date. However, as a song about fast cars begins to play and thus prompts Mike 504 to begin talking about his hobby of rebuilding cars, as indicated by his talent data 702, Missy 503 might act extraordinarily disinterested, because as indicated in her turn-offs data 611, she does not like mechanics. The user 116 may attempt to change this interaction between the characters, Missy 502 and Mike 504, by stopping the play of the song about fast cars and starting a song about surfing, which is one of Missy's talents, as indicated by her personality data.

Note that the user selections for controlling the songs included in the playlist may be based upon the user's taste, or the user 116 may make selections of music based upon how the user 116 desires for the game to proceed. In this regard, the user 116 selects the music, but the characters AI personality determines how the character's behavior is automatically affected and controlled by the music selected by the user 116. Further, the behavior of the game environment and/or the characters is tangentially based also upon the music-powered attributes associated with the music.

It should also be noted that the user selections for controlling the songs included in the playlist may also be used by the game unit 104 to automatically select additional songs to be included in the playlist. In particular, songs having music-powered attributes similar to those of one or more songs selected by a user may be automatically selected for inclusion in the playlist. Further, songs may be automatically selected based on events within the game environment.

For example, a song about violence, as indicated by the song's music-powered attributes, may be automatically selected in response to a violent behavior exhibited by one of the characters within the gaming environment. In another example, a character's personality data may indicate that he has a favorite song that has not been played in the gaming environment for a relatively long time, and such song may, therefore, be automatically selected for inclusion in the playlist. The music-powered attributes of the songs automatically selected for inclusion in the playlist, like the music-powered attributes associated with user selected songs, may be used to control the game environments (e.g., control the behavior of a character in the game environment).

Although Club Mojo has been used as an exemplary game comprising interactive characters (i.e., characters that appear to interact with each other), there are other types of games that can be music-powered. Indeed, another exemplary gaming environment may be a shooter game, wherein a plurality of weapons can be used in defending a character in an adversarial gaming environment. The music selection inputs can control the vulnerability of a character in the game, the effectiveness of the weapon chosen by the character, and/or the events, the behavior and/or features in the gaming environment. For example, based on music-powered attributes, particular music may make it rain, make a forest grow, make the wind blow or make a river swell.

FIG. 8 illustrates a system 800 in accordance with another embodiment of the present disclosure.

The system 800 comprises a server 802, a game unit 804, and a business unit 806. In addition to the MPGS logic 106 and the music information 108 illustrated in FIG. 1, the server 802 further comprises user specific promotions (USP) logic 807 and metrics data 808.

The metrics data 808 generally comprises data related to a plurality of users 116 of game units 804. In this regard, metrics data 808 comprises data relating to users 116 and indicating various personal information, such as their geographical location, gender, likes/dislikes, music preferences, and the like.

The business unit 806 generally comprises USP interface logic 812. The USP interface logic 812 enables a user 814 of the business unit 806 to access services and data provided by the USP logic 807 at the server 802. In this regard, an exemplary USP interface logic 812 may comprise, for example, a web browser that communicates to the USP logic 807 via the network 118.

The USP logic 807 enables an administrator (not shown) on the server's-side of the system 800 to create, delete and modify accounts for a user 814 of the business unit 806. Data indicative of the created, deleted, and/or modified accounts is preferably stored as account data 816. In this regard, the USP logic 807 can create an account for a user 814 that allows the user 814 to manage game content, e.g., provide characters and corresponding AI personalities to the MPGS logic 106, and to provide music selections to the MPGS logic 106 specifically directed at marketing promotions. Therefore, when a user 116 of a game unit 104 initiates a game, the USP logic 807 and the MPGS logic 106 work in conjunction to provide lists of new and current game content or music and/or corresponding music powered attributes available for download associated with a promotion or business project. A typical user 814 of the business unit 806 may include record labels, artists, retailers, and the like.

As an example, the user 814 of the business unit 806 may elect to perform various queries of the metrics data 808 to determine a direct market of users 116 that have recently purchased, listened to, or requested music information data on a particular album, such as a new Rolling Stones album.

In determining this market, the user 814 may decide to promote an older Rolling Stones album or other Rolling Stone products to the same direct market group.

The user 814 can perform a variety of operations with the USP logic 807 via the USP interface logic 812. For example, the USP interface logic 812 enables the user 814 to upload game content to the USP logic 807, which the USP logic 807 in conjunction with the MPGS logic 106 can offer to a user 116 of the MPG logic 112. In this regard, when a user 116 initiates the MPG logic 112, the MPGS logic 106 on the server 102 can transmit to the MPG engine 114 a list of currently available downloads related to, for example, promotions. The MPG engine 114 can then present the download choices via the gaming environment of the MPG logic 112.

In response to a request from either the user 116 or user 814, the MPGS logic 106 can download the game content to the MPG engine 114 located on the game unit 104.

Notably, the game content can include models for characters or features within the game that may correspond to the particular promotion, e.g., a graphical character of a particular musical artist, such as Mick Jagger, and his corresponding AI personality character data. Additionally, Rolling Stones' songs can be provided. Further, the game content can include textures and sounds to be used by the MPG logic 112 through the MPG engine 114. The USP logic 807 further enables the user 814 to schedule game content downloads, schedule music downloads, and prioritize music downloads.

Furthermore, the user 814 can access the metrics data 808 that is collected by the MPGS logic 106. This metrics data 804 preferably comprises historical data representative of the music industry, including trends, market likes/dislikes, hit songs, frequency of downloads corresponding to artist and/or specific songs, and the like. The user 814 is provided access to the metrics data 804 through the USP interface logic 812 and the USP logic 807, which the user 814 can then use to target downloads to user preference, as described hereinabove.

In another example, a record label or an artist may have an album debuting in the near future. Therefore, a user 814 may be a representative of the record label of the artist, and may choose to provide a promotional package to users 116 of gaming units 804 to promote the soon-to-be-debuting album. In this regard, the user 814 may compile a package (not shown) that comprises a digital data representation of a special release of a song or songs on the album including with the music-powered song attributes that are useable by the MPG engine 114 and the MPG logic 112 of gaming units 104. The user 814 may further elect to provide data indicative of special characters relating to the debuting album. For example, if the user 814 is promoting a Brittany Spears album, the user 814 may elect to provide a character and related AI personality data of a character resembling Britney Spears, or to provide a plurality of characters and corresponding personalities that are indicative of current events in Britney Spears' life. For example, the user 814 may elect to download game content corresponding to Spears' new perfume, "Curious," and attempt to promote the perfume through the MPG engine 114 and MPG logic 112.

Likewise, a user 116 of the MPG logic 112 may elect to create a gaming environment directed at a favorite and popular star or artist. Therefore, the user 116 may choose to become a "gaming fan" and unilaterally download game content and music information 108 corresponding to his favorite artist or star. Therefore, throughout game play, over time, the user's gaming environment might evolve into a gaming environment focused on the chosen star or artist.

The foregoing can be effectuated via the MPG engine 114 and the MPGS logic 106. As described hereinabove, the MPG engine 114 provides user preference and use metrics data to the sever 802, which the MPGS logic 106 stores as metrics data 808. Therefore, a user 814 of the business unit 806 can view data reported by the MPGS logic 106 and stored as metrics data 808 via the USP logic 807. The user 814 can identify trends, for example, in music preferences geographically.

The USP logic 807 enables a user 814 of the business unit 806 to upload particular songs to a plurality of users 116 in order to promote the particular song. In this regard, the USP logic 807 receives the request to upload and transmits the song and its music-powered attributes to the MPG engine 114 of the game unit 804.

As another example, a user 815 may represent a particular artist, and the user 814 may desire to promote a concert in a particular geographical region. In this regard, the user 814 of the business unit 806 might provide information to the MPG logic 814 a promotional version single of the artist that is going to be in concert in the particular geographical region in accordance with users 116 that are actually physically located in that geographical region.

In another example, a record label may be considering signing several artists and may wish to test consumers' reactions to songs from these artists. Therefore, a user 814 may choose to provide a promotional package to users 116 to test market songs from such artists. In such an example, the MPG engine 114 can define metrics data 808 indicative of the user's preference and use associated with songs or other content included in the promotional package and provide such data 808 to the server 802. Such data 808 may then be analyzed by the user 814.

In another example, a record label may be considering associating an artist with a particular image or themes may wish to test consumers' reactions to those associations. Therefore, a user 814 may choose to provide a game content inventory 241 to users 116 to test market the association of songs from the artist to particular images or themes.

In such an example, the MPG engine 114 can define metrics data 808 indicative of the user's preference and use associated with songs or other content included in the game content inventory 241 and provide such data 808 to the server 802. Such data 808 may then be analyzed by the user 814. As an example of application, a record label can determine if branding a country artist with pop images and themes in an attempt to cross that artist over to the pop genre will turn-off existing country fans.

Figure 9:
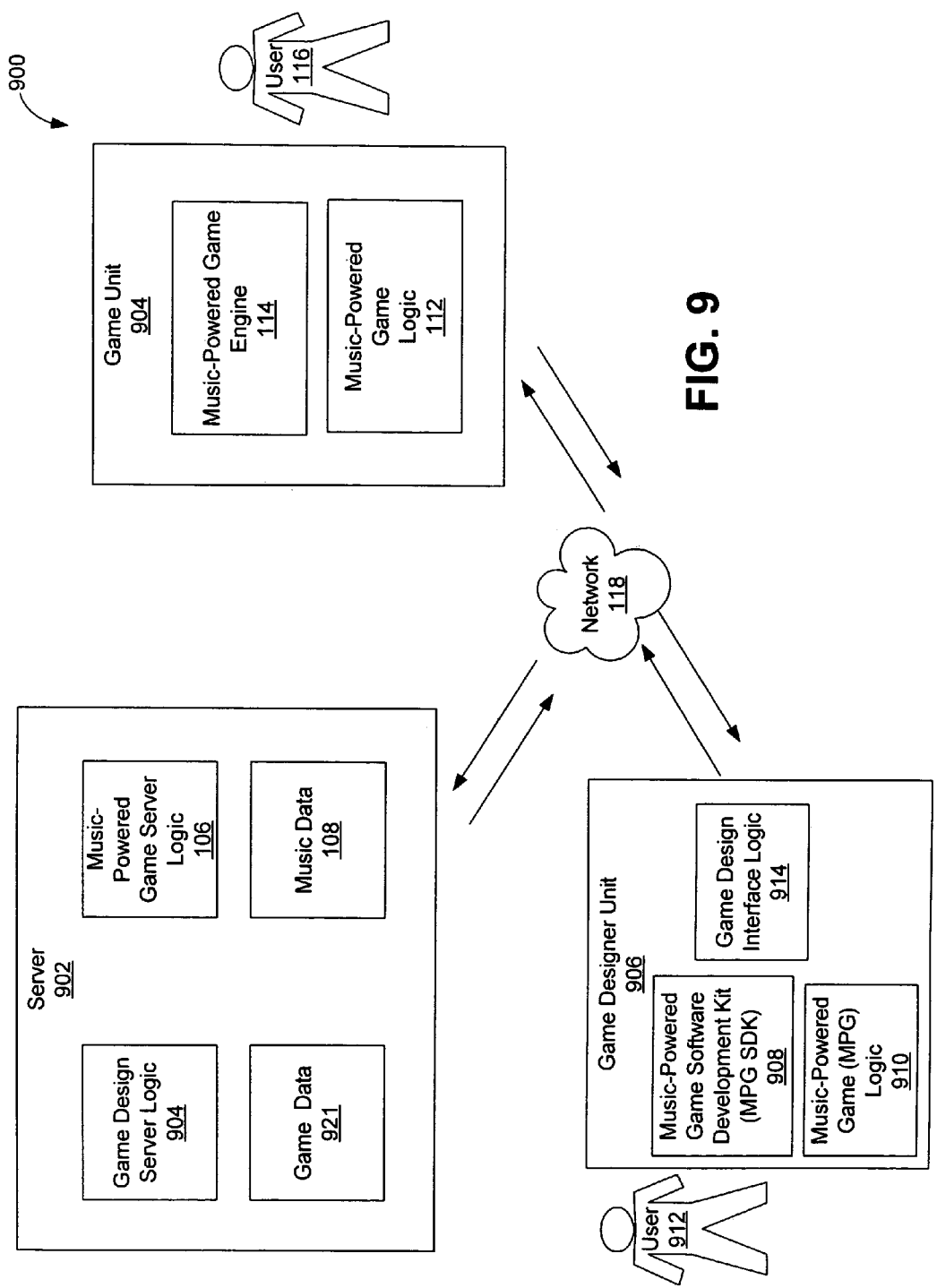
FIG. 9 is a block diagram of gaming system in accordance with an exemplary embodiment of the present disclosure.

System 900 illustrated in FIG. 9 illustrates yet another embodiment of the present disclosure.

System 900 comprises a server 902, a game unit 904, and a game designer unit 906. In addition to the MPGS logic 106 and the music data 108, the server 902 further comprises game design server logic 904 and game data 921.

The game designer unit 906 comprises game design interface logic 914, a music-powered game software development kit (MPG SDK) 908, and newly developed music-powered game logic 910.

The user 912 is preferably a game developer. The user 912 develops MPG logic 910 defining a new game (i.e., a game different than the one defined by the MPG logic 112) using the MPG SDK 910. The user 912 can then upload via the interface 914 data representative of the developed game and associated game content to the server 902.

The game design server logic 904 in conjunction with the MPGS logic 106 can then offer new games and corresponding game content to the user 116 of the game unit 904.

Figure 10:
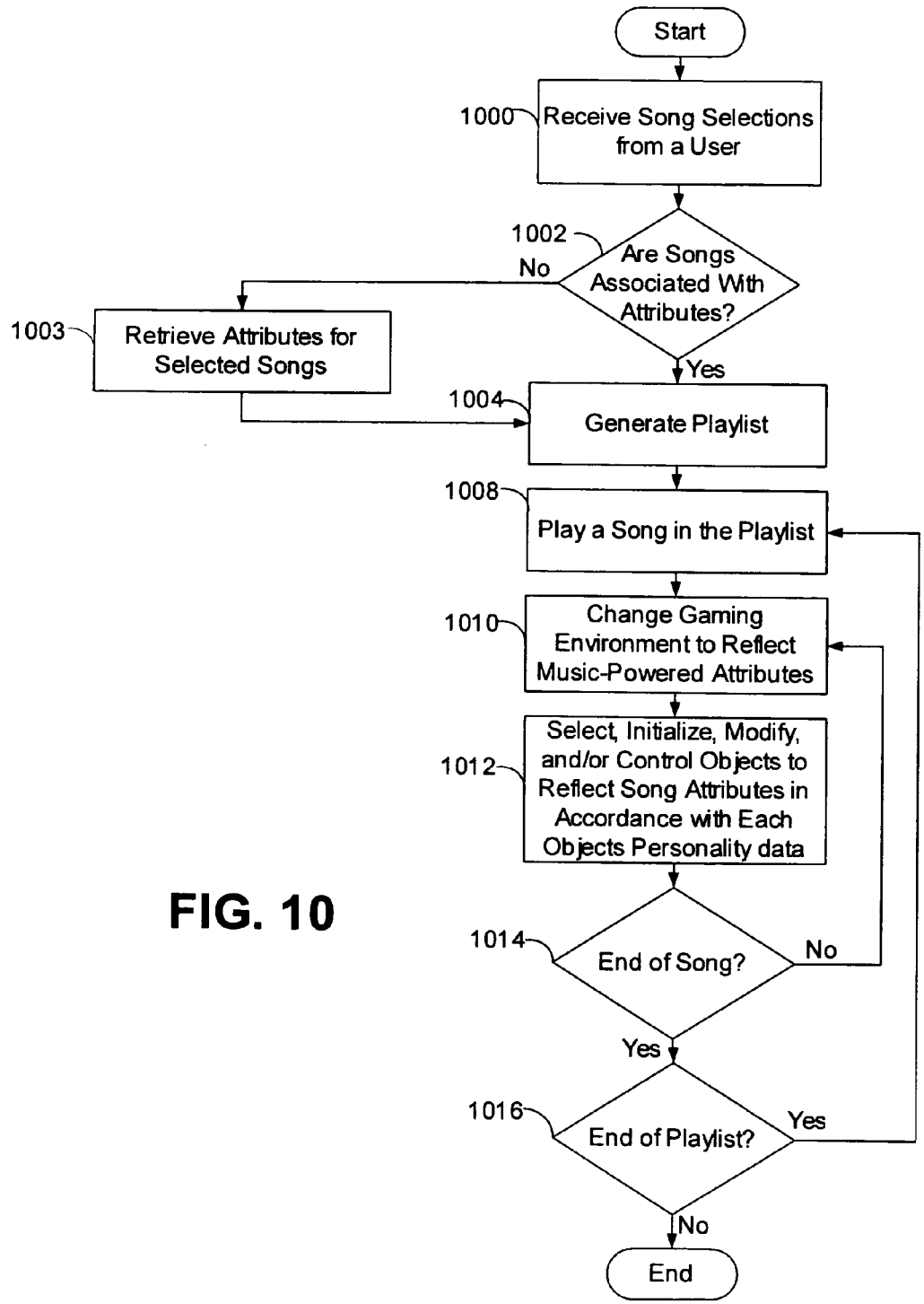
FIG. 10 is a flowchart illustrating exemplary architecture and functionality of the gaming system of FIG. 1.

FIG. 10 is a flowchart illustrating an exemplary architecture and functionality of the MPG logic 112 and the MPG engine 114 of FIG. 1.

A user 116 (FIG. 1) or other source selects a song or songs to be played during game play of the MPG logic 112 (FIG. 1) in step 1000. The MPG engine 114 can receive the song selections from the user 114 via the GUI of the MPG logic 112. As described herein, the selected music can originate from a variety of sources. In this regard, the user 116 can select songs that have been stored digitally on the user's game unit 104 (FIG. 1), the user 116 can select songs from CDs or DVDs, or the user 116 can select songs from a stream server. Other sources for the songs are also possible in other embodiments of the present disclosure.

In step 1002, if the songs selected by the user 116 (FIG. 1) do not have server music-powered attributes 251 (FIG. 2) associated with them, the MPG engine 114 retrieves server music-powered attributes 142 (FIG. 1) and corresponding identifiers 143 (FIG. 1) corresponding to the selected songs from the MPGS logic 106 (FIG. 1) on the server 102 (FIG. 1) in step 1003.

The MPG engine 114 generates a playlist that comprises a list of songs that are to be sequentially played to the audio device 214 (FIG. 2) during the game play in step 1004. The playlist preferably includes music identified by the selections received in step 1000. Note that if the user 116 has played the MPG logic 112 previously, and there exists a playlist encompassing the user's past song selections, then the MPG engine 114 can employ the historical data corresponding to the user's past selections to create the playlist. Incidentally, when the MPG logic 112 initializes, the MPG engine 114 provides the MPG logic 112 game parameters and content corresponding to the historical playlist. Therefore, the gaming environment displayed by the MGP logic 112 may look and feel in accordance with the user's indicated music preferences.

The MPG engine 114 outputs an audio signal to the audio device 214 indicative of the current song in the playlist in step 1008. The MPG logic 112 modifies the look and feel of the gaming environment to reflect the music-powered attributes 251 in step 1010, and the MPG logic 112 initializes, selects, modifies, and/or control object traits, behaviors, and the like to reflect the song music-powered attributes in step 1012.

At the end of the song, in step 1014, the MPG engine 114 plays the next song in the playlist 120 (FIG. 1), unless it is determined in step 1014 that all of the songs of the playlist have been played. Note that the methodology depicted in FIG. 10 may be repeated as desired. Further, in other embodiments, the MPG logic 112, rather than the MPG engine 114, may control the play of the selected music.

Figure 11:
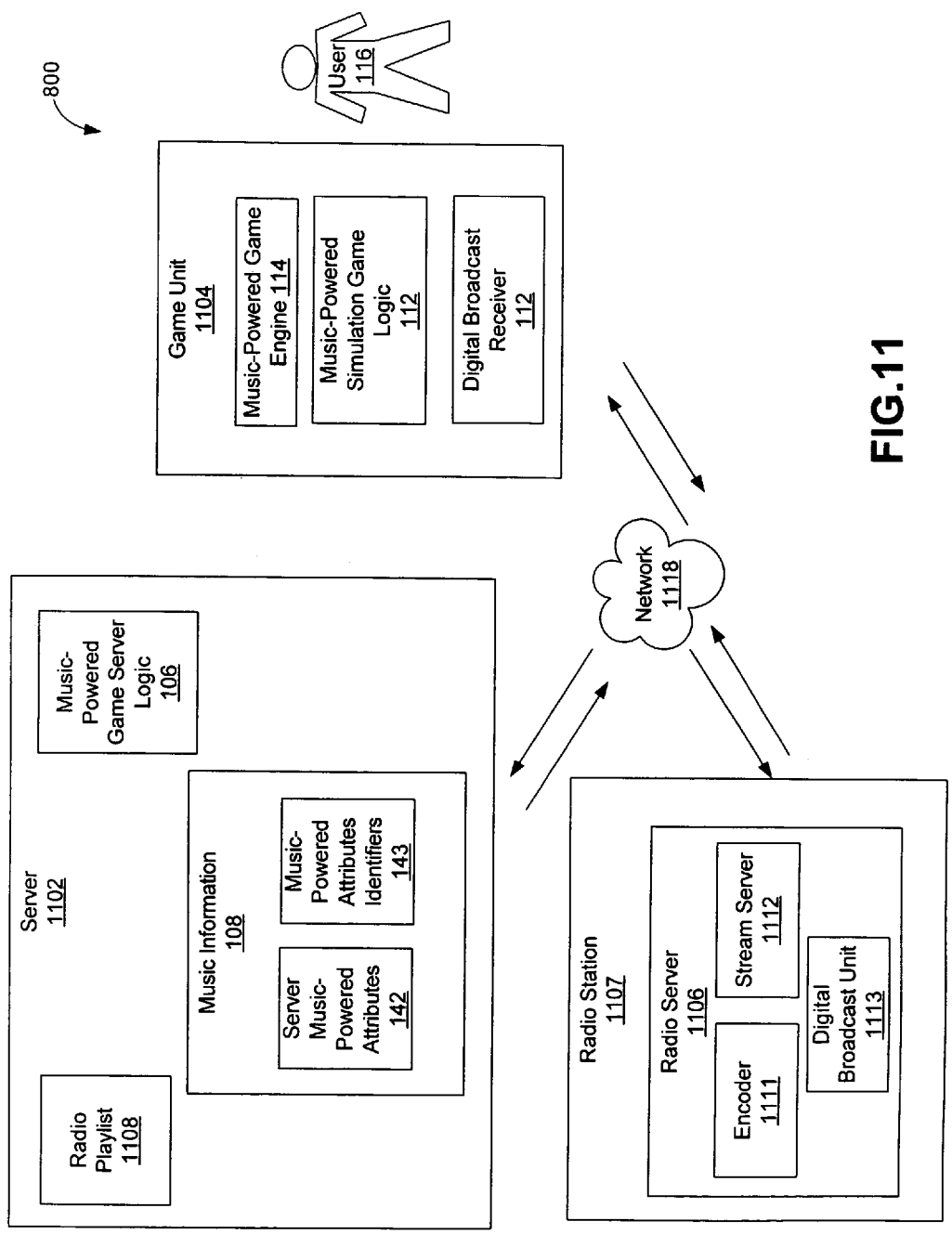
FIG. 11 is a block diagram of gaming system in relation to a digital broadcast unit in accordance with an exemplary embodiment of the present disclosure.

FIG. 11 illustrates a system 1100 in accordance with another embodiment of the present disclosure. The system 1100 enables a game unit 1104 to use songs broadcast from a radio station 1107 in the MPG 112 to select, initialize, create, modify, and/or control events that occur during game play, the features and/or behaviors of video game objects, including objects representative of characters or inanimate objects, within the game, and/or the general look and feel of the gaming environment.

System 1100 comprises a server 1102, a game unit 1104, and a radio server 1106 associated with the radio station 1107. The server 1102 transmits server music-powered attributes 142 and corresponding identifiers 143 retrieved from the music information 108 to the MPG engine 114 corresponding to the songs being transmitted by the radio server 1106. In this regard, streaming data representative of the songs may be broadcast directly to the game unit 1104 by the radio server 1106, or the server 1102 may receive streaming data representative of the songs, which the server 102 broadcasts to the game unit 1104.

In this regard, an encoder 1111 on the radio server 1106 translates the music into streaming data representative of the songs, as described herein with reference to streaming data, compresses the streaming data, and transmits the data, via the network 118. The stream server 1112 then makes the streaming data available to the network 1118.

The streaming data transmitted by the radio server 1106 comprises identification information, for example in the header of the streaming data that is being transmitted. The identification information comprises data indicative of the song that is being transmitted.

When the streaming server 1112 of the radio server 1106 broadcasts the songs to the network 1118, the server 1102 can receive the streaming data from the radio server 1106. The server 1102 can read the identification information contained in the streaming data for the song corresponding to the data received from the radio server 1106 and use such identification information to search the music information 108. If the server 1102 locates the requested music-powered attributes 142 on the server music-powered attributes 142 associated with the identified song in the music information 108, then the server 1102 transmits the song and its associated music-powered attributes to the MPG engine 114. The MPG engine 114 provides the music-powered attributes 251 to the MPG logic 112 and plays the song via the audio device 214 (FIG. 2) while the MPG logic 112 uses the music-powered attributes to sleet, initialize, create, modify and/or control the gaming environment, including events that occur during game play, the features and/or behaviors of video game objects, including objects representative of characters or inanimate objects, within the game, and/or the general look and feel of the gaming environment.

Alternatively, the radio server 106 may comprise a digital broadcast unit 1113, which broadcasts digital radio signals. In such an embodiment, the server 1106 can broadcast both the music and the music information 108, including the music-powered attributes 142 associated with the broadcast music, to the game unit 1104. The game unit 1104 may then play the music in the gaming environment and use the music-powered attributes 142 to affect the gaming environment as described herein. Note that the radio server 1106 may download the foregoing music information 108 from the server 1102 so that the radio server 1106 may incorporate such information 108 into its broadcast.

Alternatively, the server 1102 may comprise a radio playlist 1108 associated with the radio server 1106. The radio playlist 1108 preferably identifies a plurality of songs that a producer at the radio station 1107 has determined will be played during a radio show. The server 1102 stores the radio playlist 1108, identifies songs in the radio play list 1108, as described herein, and locates the music-powered attributes of each song in the server music-powered attributes 142 via the identifiers 143 in the music information 108. The MPGS logic 106 then transmits the music-powered attributes corresponding to each song that is to be played during a given time period to the MPG engine 114, and stores the music-powered attributes in the server music-powered attributes 251. The MPG engine 114 then provides the music-powered attributes 251 to the MPG logic 112, which uses such music-powered attributes to affect the gaming environment according to the songs being played.

When the server 1102 uses the radio playlist 1108, the streaming data broadcast by the radio server 1112 can be broadcast directly to the game unit 1104. In this regard, the MPG engine 1114 identifies the song represented by the streaming data received to determine the music-powered attributes 251 to provide to the MPG logic 112 when a particular song is being received. If such music-powered attributes 251 are not provided in the streaming data, the attributes 251 may be received from other sources, such as the server 1202, for example.

The user 116 may further control his/her gaming environment by switching radio or other media streaming stations that may be playing other classified music or sounds (e.g., voice dialogue from sports or political talk shows) that will then impact the gaming environment accordingly. As an example, attributes associated with streaming data from a political talk show may indicate that the content of the streaming data is very argumentative. As a result, characters within the gaming environment may be controlled, based on the such attributes, such that they appear to be arguing or hostile to one another.

Figure 12:
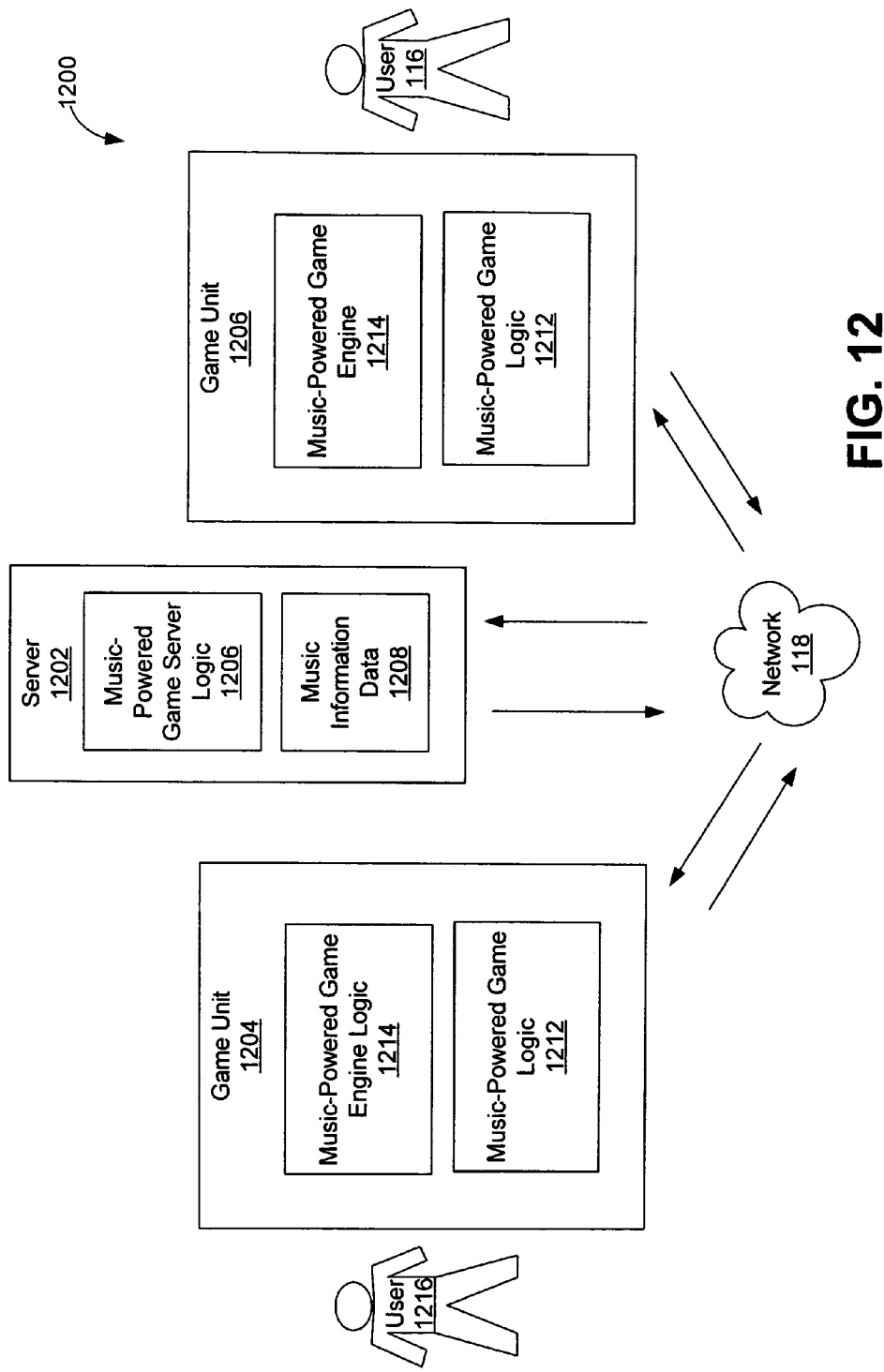
FIG. 12 is a block diagram of multiple player gaming system in accordance with an exemplary embodiment of the present disclosure.

FIG. 12 illustrates a system 1200 in accordance with another embodiment of the present disclosure.

The system 1200 of FIG. 12 comprises a server 1202 and multiple game units 1204 and 1206. Each game unit 1204 and 1206 comprises MPG logic 1212 and a MPG engine 1214. The MPG logic 1212 and the MPG engine 1214 behave in the manner described herein with reference to the MPG logic 112 and MPG engine 114, respectively, of FIGS. 1 and 2.

However, each MPG engines 1214 of the game units 1204 and 1206 further enable multiple player game play. In this regard, the MPG engine 1214 on the game unit 1204 facilitates multiple player game play by communicating with the MPG engine 1214 on the game unit 1206.

In this regard, the user 116 can share game content and information over the network 118 through the MPG engines 1214. Furthermore, the communicating MPG engines 1214 ensure that the gaming environments of the multiple game units 1204 and 1206 are synchronized.

For example, if the user 116 has one or more friends 1216 who have a game unit 1204 similar to that of the user 116, then the user 116 and his friends 1216 can play the game simultaneously. During simultaneous play, the MPG engines 1214 synchronize the gaming environment of user 116 with that of his friends 1216, including synchronizing each song played by the game units 1204 and 1206 so that the users 116 and 1216 hear the same songs simultaneously. As a specific example, if the user 116 selects a particular song to be placed in the playlist 120 (FIG. 2A) during game play, the MPG engine 1214 on the game unit 1206 commands the MPE engine on the game unit 1204 to play the same song on the playlist 120 of the game unit 1204. In this regard, if user 116 selects a country song during the course of game play, then the song plays, not only on the game unit 1206 of the user 116, but also on his friends' game unit 1204.

Alternatively, synchronization of the gaming environments on the respective game units 1204 and 1206 can be managed by MPGS logic 1206 on server 1202. In this regard, each MPG engine 1214 communicates changes in their respective gaming environments to the MPGS logic 1206, and the MPGS logic 1206 ensures synchronization.

Figure 13:
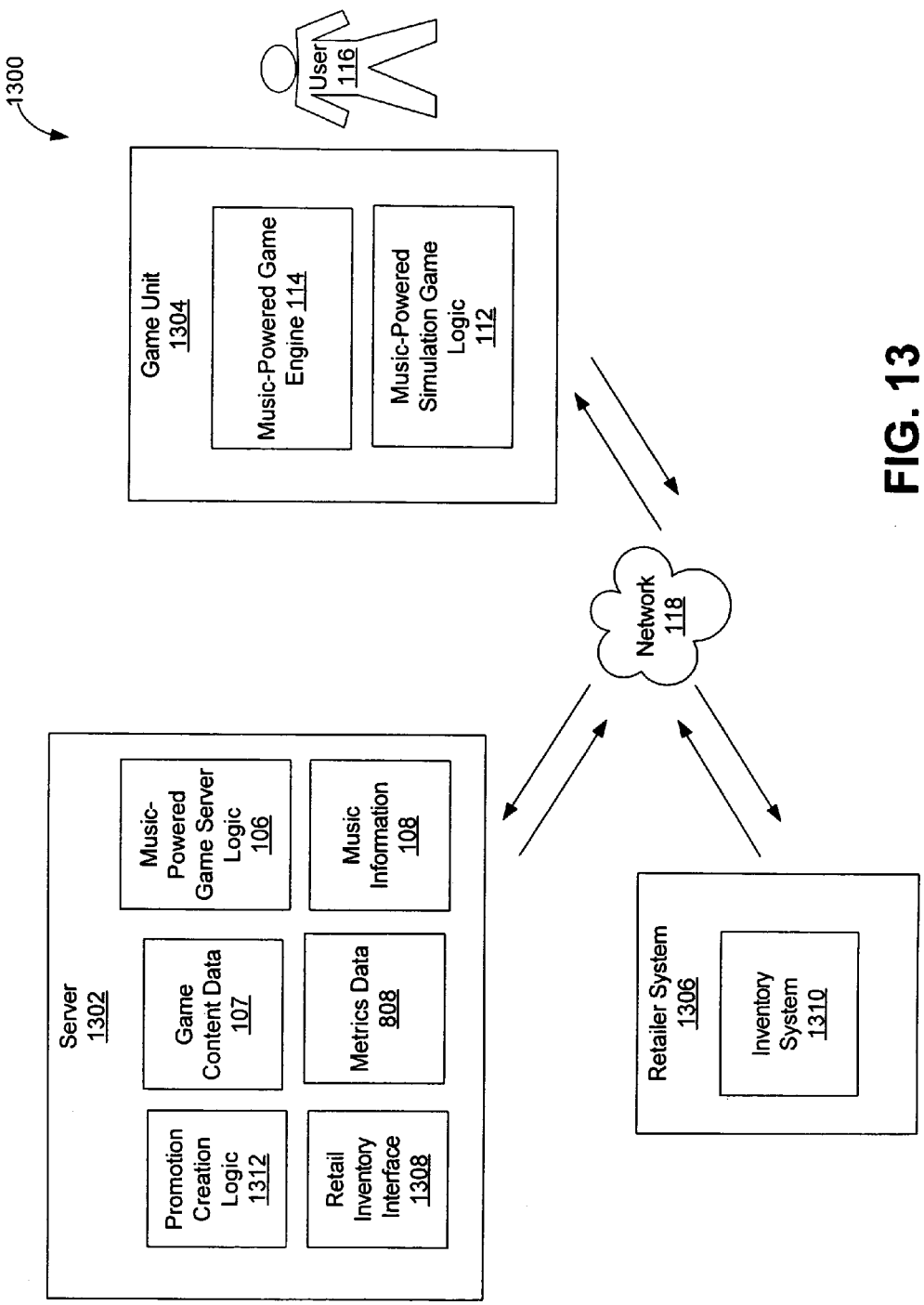
FIG. 13 is a block diagram of a gaming system interfaced with a retailer inventory system in accordance with an exemplary embodiment of the present disclosure.

FIG. 13 illustrates another system 1300 in accordance with an embodiment of the present disclosure.

System 1300 comprises a server 1302, a game unit 1304, and a retailer system 1306. The game unit 1304 of the system 1300 behaves in the manner described with reference to the game unit 104 of FIG. 2A.

However, the server 1302 comprises a retail inventory interface 1308 and promotion creation logic 1312. In such an embodiment, the retail inventory interface 1308 is configured to access an inventory system 1310 on a retailer system 1306. During access, the inventory interface 1308 monitors inventory listed in the inventory system 1310. If the inventory interface 1308 determines that a particular retail center has a surplus of a particular item, such as, for example, a surplus of Beyonce CDs, then the inventory interface 1308 provides this information to the promotion creation logic 1312. In addition, the inventory system 1310 may provide other information, including, but not limited to the location of the surplus, to the inventory interface 1408.

The promotion creation logic 1312 receives the information and creates a marketing promotion directed at reducing the surplus at the retail center indicated. For example, if the surplus of Beyonce CDs is at a Walmart in Dallas, Tex., the promotion creation logic 1312 may query the metrics data 808, as described herein with reference to FIG. 8, to determine a group of users 116 located in the Dallas area that may be interested in buying a hip-hop CD. The promotion creation logic 1312 then may compile music information 108 and game content data 107, that can include one or more advertisements and/or other information relating to Beyonce and transmit the music information 108 and the game content 107 to those users 116 in the group identified by the metrics data 808 as being in the targeted geographical area.

Figure 14:
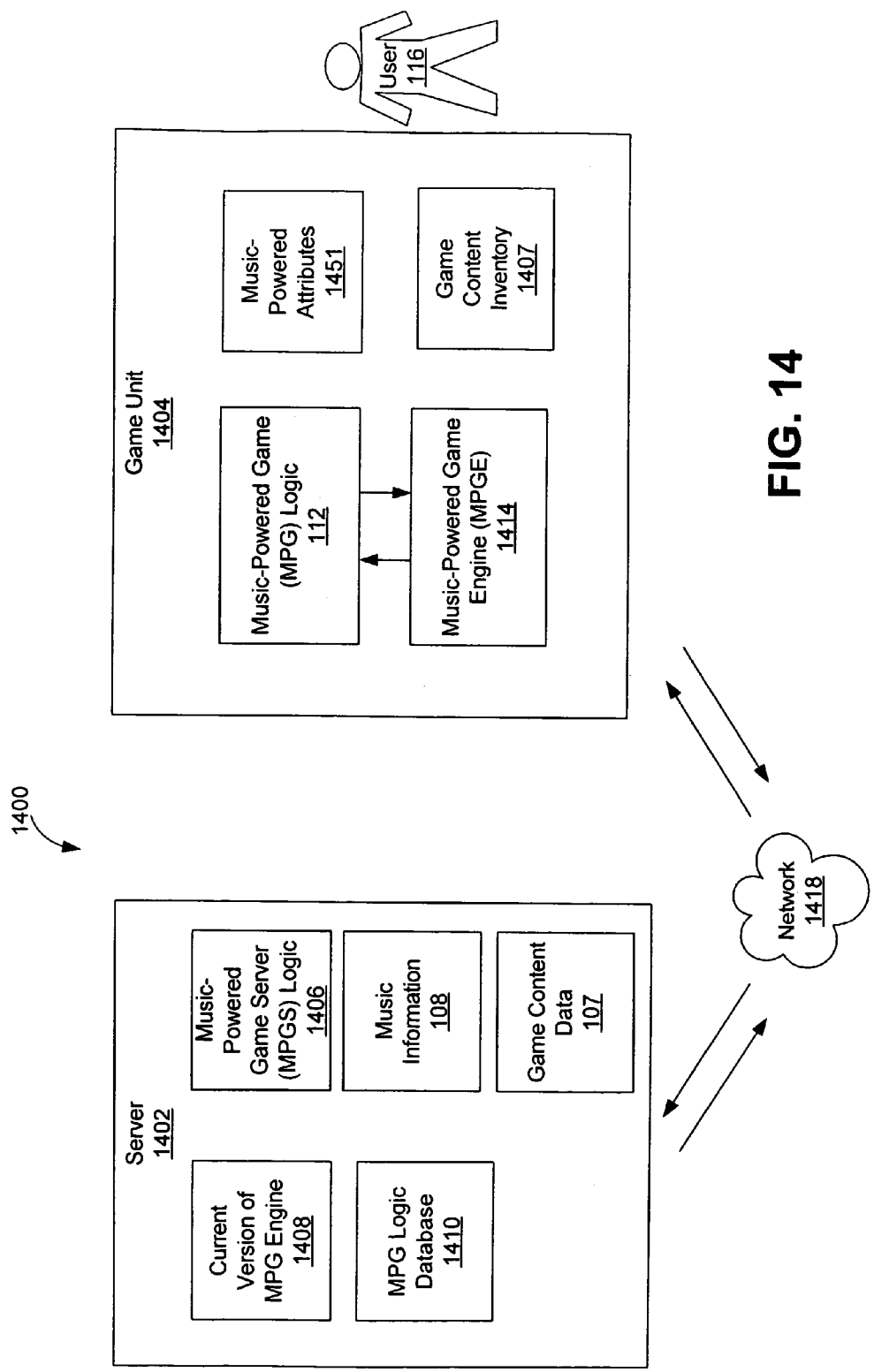
FIG. 14 is a block diagram of a gaming system having version synchronization in accordance with an exemplary embodiment of the present disclosure.

FIG. 14 illustrates a system 1400 in accordance with another embodiment of the present disclosure. As will be described in more detail below, the system 1400 synchronizes versions of the system components, such as for example, music information 108 and game content data 107.

In this regard, the system 1400 comprise the MPG logic 112, the MPG engine 1414, game inventory content 1407 and music-powered attributes 1451, hereinafter collectively referred to as the "components." Preferably, each of the components is associated with a unique identification string that specifically identifies the composition of such component.

As an example, the MPG logic 112, as described herein, is preferably a software component that is configured to play a particular game, including creating a GUI, displaying objects, using the displayed objects' personality data in game play, and communicating with the user 116. There may exist a plurality of games that can be interfaced with the MPG engine 1414, and each game may periodically be changed, modified, edited, and updated by its game designer. With each new change and/or modification to the game, the designer may desire to provide the modified game to the user 116. In order to ensure that each game and subsequent modified game can be distinguished, the designer preferably associates a unique identifier, referred to as a "version identifier," with the modified game, hereinafter referred to as the "game version."

Figure 16:
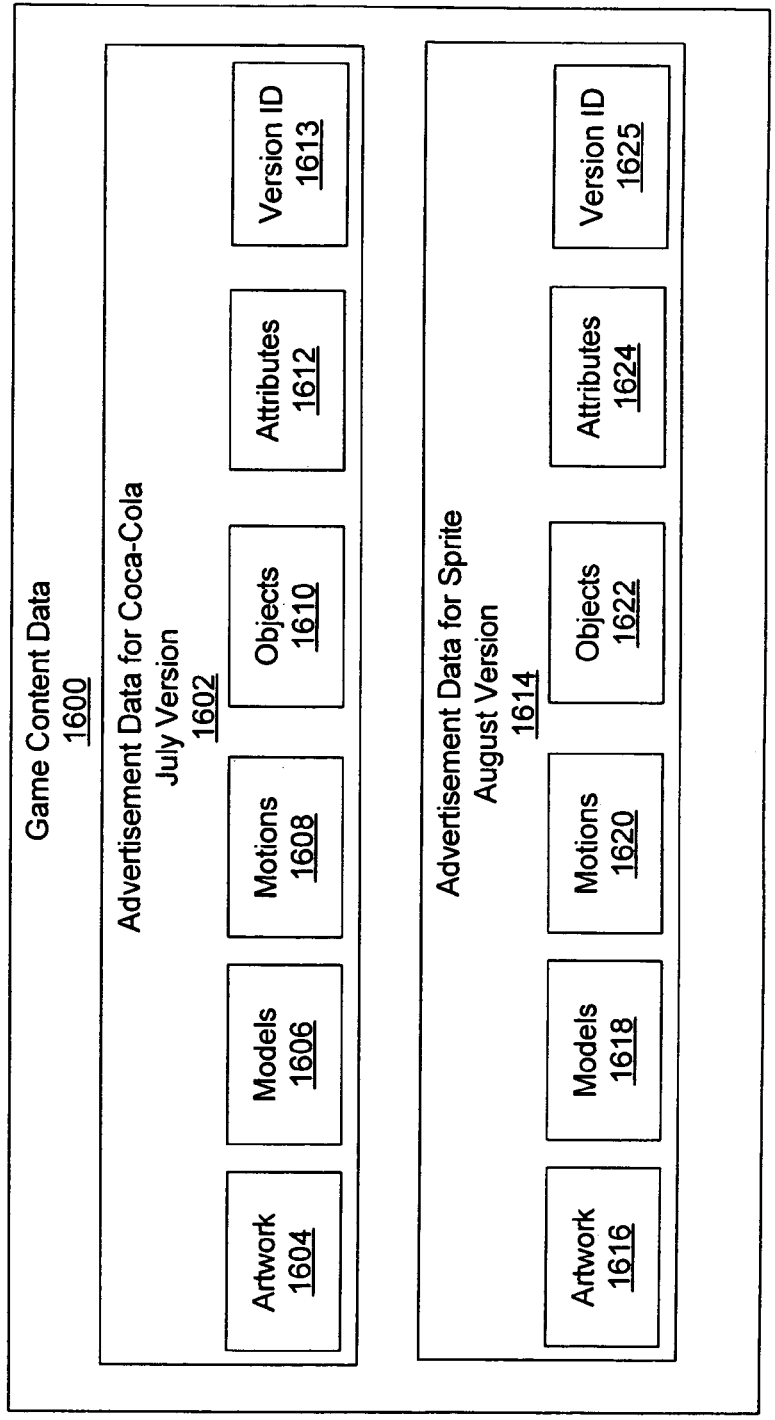
FIG. 16 is a block diagram of game content data in accordance with an exemplary embodiment of the present disclosure.

Additionally, the game content data 107 defines various features to be used in the gaming environment provided by the MPG logic 112, such as artwork, models, motion files, objects, and/or object data. FIG. 16 illustrates one example of game content data 1600 in which version identifiers are used to identify different versions of advertisements. In this regard, an advertiser may launch a campaign to advertise Coca-Cola for the month of July. Data associated with the campaign is stored in the game content data 1600 as advertisement data for Coca-Cola July Version 1602. The "July Version" may comprise artwork 1604, models 1606, motions 1608, objects 1610, and object data 1612 associated with the campaign. The "July version" may also comprise a version identifier 1613 for uniquely identifying this version.

Additionally, an advertiser may launch a comparing to advertise Sprite for the month of August. Data associated with the campaign is stored in the game content data 1600 as advertisement data for Sprite August Version 1614. The "August Version" may comprise artwork 1616, models 1618, motions 1620, objects 1622, and object data 1624 associated with the campaign. The "August version" may also comprise a version identifier 1625 for uniquely identifying this version. Thus, the system 1400 can be configured to ensure that the "July Version" is downloaded and used by the MPG logic 112 during July and the "August Version" is downloaded and used by the MPG logic 112 in August. Other unique versions may be based on other factors pertaining to advertising objectives such as a different version, which may include different advertisements from different advertisers for each artist, each album, and/or each song. These versions may also change with time or in accordance with other factors.

In particular, during the month of July, the MPGS logic 1406 can be requested to search for the version identifier 1613 and to provide the other data 1602 correlated with this identifier 1613 to the MPG engine 1414, which may then insert such data 1602 into the gaming environment by providing it to the MPG logic 112. Further, during the month of August, the MPGS logic 1406 can be configured to search for the version identifier 1625 and to provide the other data 1614 correlated with this identifier 1613 to the MPG engine 1414, which may then insert such data 1614 such data 1614 into the gaming environment by providing it to the MPG logic 112. In other examples, any of the other components of system 1400 may be updated with new versions. Another exemplary embodiment for updating component versions will be described below with respect to FIG. 14.

With reference to FIG. 14, a server 1402 comprises MPGS logic 1406, a current version of the MPG engine 1408, a database comprising current versions of a plurality of MPG logic 1410, music information 108, and game content data 107. As described herein, the game content data 107 comprises information related to artists, albums, music, and advertisements, and such information may be specifically tied to server music-powered attributes 142. Also described further herein, the game data content 107 comprises such information as compiled software, models, animations, textures, scripts, and/or other static data. Other information may be included in the game content data 107 in other embodiments.

The MPG engine 1414 of system 1400 differs from that embodiment disclosed with reference to FIG. 2A in that the MPG engine 1414 is configured to synchronize versions of the various components of the system on the game unit 1404 with the server 1402.

Therefore, when a user 116 initiates the MPG logic 112, the MPG engine 1414 retrieves the version identifiers of the components (e.g., the game content inventory 1441, the MPG logic 112, the music-powered attributes 1451, and the MPG engine 1414). The MPG engine 1414 then requests from the MPGS logic 106 via the network 1418 the current version identifiers associated with such components.

The MPGS logic 1406 transmits the requested current version identifiers to the MPG engine 1414. The MPG engine 1414 compares the current version identifiers transmitted by the MGPS logic 1406 and the version with the retrieved version identifiers to determine if the versions are synchronized (i.e., the current versions are stored in the game unit 1404).

If a version exists on the game unit 1404 that is not located on the server 1402 (e.g., a current version identifier for a component does not match the component's version identifier), the MPG engine 1414 removes the version from the game unit 1404. Thus, it is possible for a user of server 1402 to discontinue the use of a component by removing the component's version identifier from the server 1402.

Moreover, if a version on the game unit 1404 differs from the version on the server (e.g., if the a component's current version identifier, which is received from the server 1402 does not match the component's version identifier stored in the game unit 1404), the MPG engine 1414 downloads the current version from the MPGS logic 1406. In this regard, as described herein, a designer may create a new version for the MPG logic 112. Therefore, when a user 116 initially initiates the MPG logic 112 after the designer has created and stored a new version of the MPG logic 112 on the server 1402, the version that is currently on the game unit 1404 is obsolete. Therefore, the MPG engine 1414 determines that the versions are different and downloads the current version.

If a version is found on the server 1402 and the version is not located on the game unit 1404, the MPG engine downloads the current version from the server 1402. In this regard, as the system 1400 evolves, new game components may be designed for implementation on the game unit 1404. Thus, in order to ensure that the game unit 1404 comprises all the available components, the MPG engine 1414 preferably downloads any current version of a component that is not presently implemented on the game unit 1404.

The MPG engine 1414 can repeat this process for each versioned component of the game unit 1404.

Figure 15:
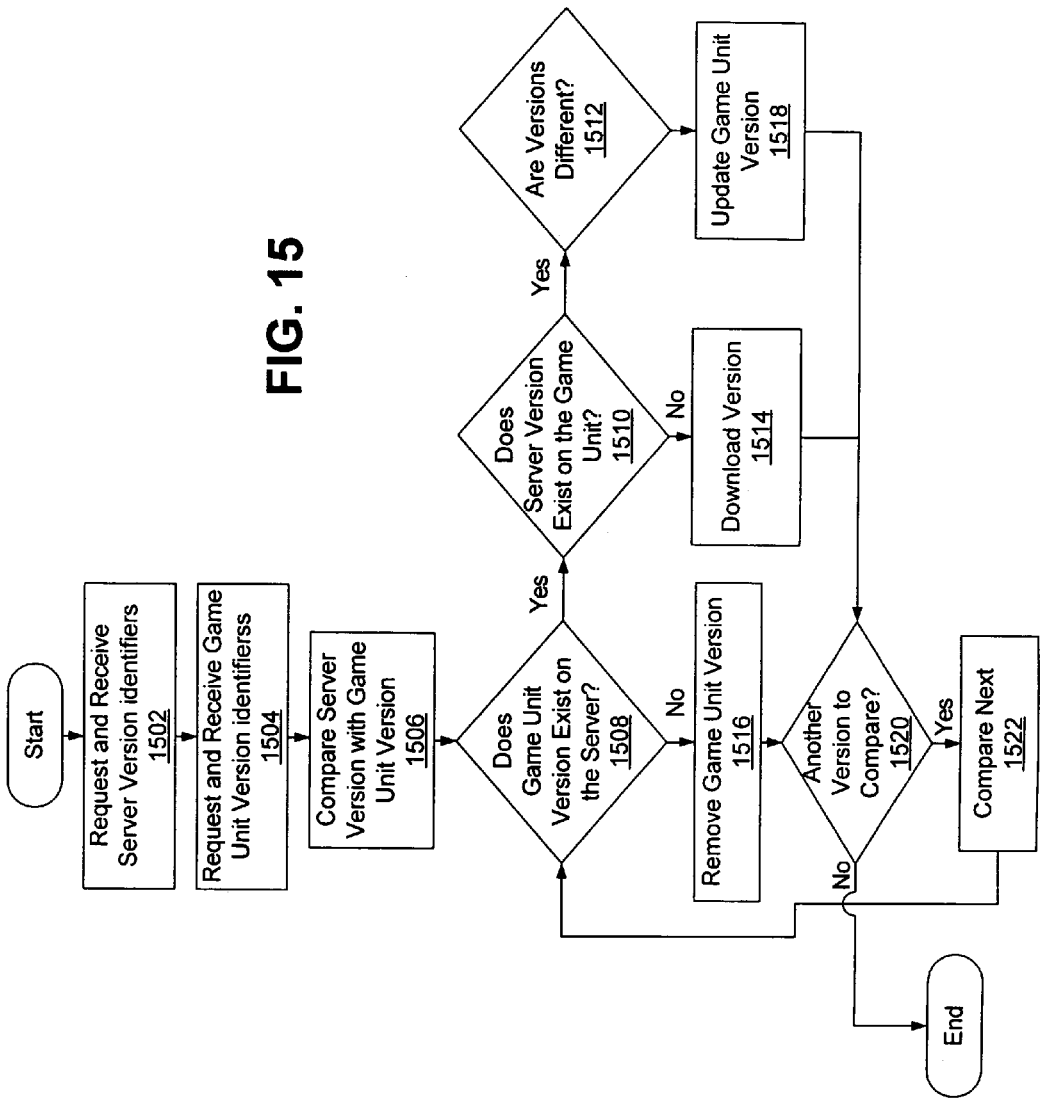
FIG. 15 is a flowchart illustrating exemplary architecture and functionality of the gaming system of FIG. 14.

FIG. 15 is a flowchart illustrating an exemplary architecture and functionality of the MPG engine 1414 with version synchronization of FIG. 14.

The MPG engine 1414 requests and receives the server version identifiers of the game content 107, the music information 108, the MPG logic 112 from the database 1410, and the MPG engine 1508 in step 1502. The MPG engine 1414 retrieves the game unit version identifiers of the corresponding components as indicated in step 1504.

The MPG engine 1414 compares version identifiers of a particular component, for example the version identifiers of the MPG engine 1414, as indicated in step 1506.

If the game unit version identifier of the particular component does not exist on the server 1402 in step 1508, then the MPG engine 1414 removes the component's game unit version in step 1516.

If the server version identifier of the particular component does not exist on the game unit 1404 in step 1512, then the MPG engine 1414 downloads the component's current version to the game unit 1404 in step 1518.

If the version identifiers of the particular component are different in step 1514, then the MPG engine 1414 updates the component's game unit version in step 1520.

If there are no more version identifiers to compare in step 1522, then the synchronization of the versions on the game unit 1404 with the versions on the server 102 ends. If there are version identifiers for another component to compare in step 1522, then the MPG engine 1414 compares the next set of version identifiers in step 1524.

Figure 17:
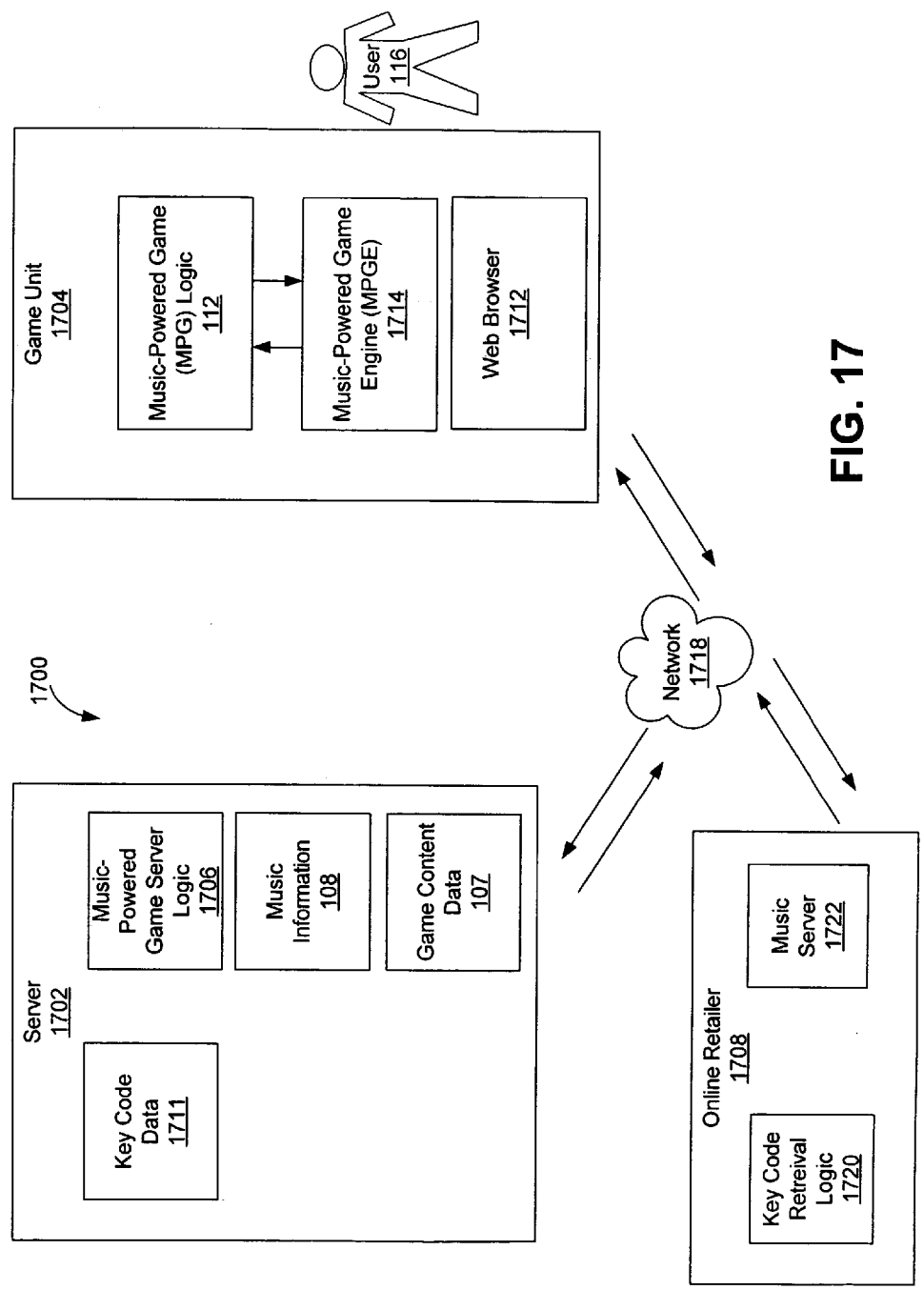
FIG. 17 is a block diagram of a gaming system having music authentication in accordance with an exemplary embodiment of the present disclosure.

FIG. 17 illustrates a system 1700 in accordance with another embodiment of the present disclosure.

The system 1700 comprises a server 1702, a game unit 1704, and an online retailer 1708. The server 1702 comprises music-powered game server (MPGS) logic 1706, music information 108, game content data 107, and key code data 1711. The game unit 1704 comprises MPG logic 112, MPG engine 1714, and a web browser 1712.

In system 1700, the user 116 desires to purchase music from the online retailer 1708 over the network 1718 via a web browser 1712. In such an embodiment, the user 116 requests a music purchase and provides a method of payment to the music server 1722. The key code retrieval logic 1720 requests a unique key code from the MPGS logic 1706 on the server 1702 associated with the purchase, and the MPGS logic 1706 stores in the key code data 1711 the unique key code and a correlated identifier that identifies the music (e.g., song or album) associated with the purchase. Further, the MPGS logic 1706 transmits the key code to the key code retrieval logic 1720. The music server 1722 transmits a receipt, the key code, and a download link to the user 116 via the web browser 1712.

Thus, when the user 116 initiates the MPG logic 112 and requests that the MPG engine 1714 play the newly purchased music, the MPG engine 1714 requests a key code associated with the new music. The user 116 may enter the key code in a GUI displayed by the MPG logic 112.

The MPG engine 1714 receives the user-provided key code and requests the MPGS logic 1706 validate the key code. The MPGS logic 1706 receives the user-provided key code, searches the key code data 1711, and validates the key code to the MPG engine 1714 if the key code is found in the key code data 1711 associated with the music (e.g., song) that the user 116 is requesting that the MPG engine 114 play in the MPG logic 112.

If the MPGS logic 1706 does not find the key code, the MPGS logic 1706 does not validate the music, and the MPG engine 1714 does not play the music in the MPG logic 112.

Figure 18:
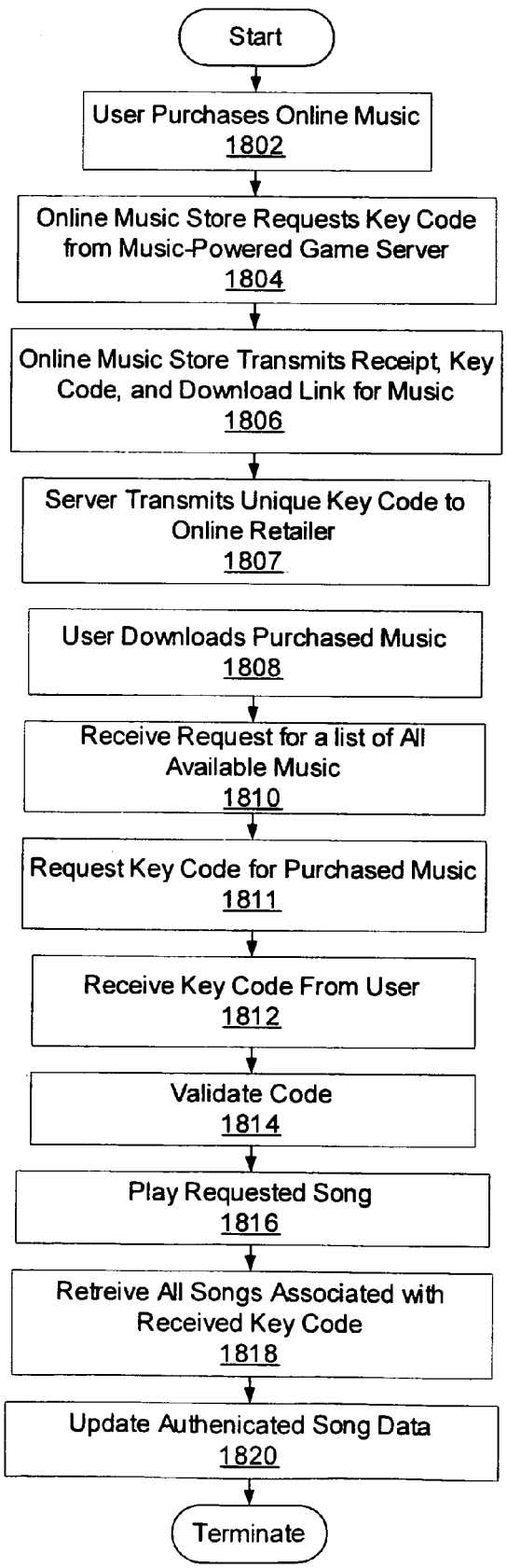
FIG. 18 is a flowchart illustrating exemplary architecture and functionality of the gaming system of FIG. 17.

FIG. 18 is a flowchart illustrating an exemplary authentication methodology performed by the system 1700 of FIG. 17.

The user 116 purchases music via an online retailer 1708 from the music server 1722 in step 1802. Upon request, the key code retrieval logic 1720 requests a key code from the MPGS logic 1706 on the server 1702 in step 1804.

The MPGS server 1706 identifies unique code, as described hereinabove, stores the key code in the key code data 1711, and transmits the key code to the key code retrieval logic 1720 in step 1807. The online music store transmits a receipt, the unique key code, and a download link from which to obtain the music to the user 116 in step 1806.

The user 116 downloads the music in step 1808, and requests a list of all available music for the MPG logic 112 in step 1810. The MPG engine 1714 requests a key code for the purchased music from the user 116 in step 1811. The MPG engine 1714 receives the key code from the user 116 in step 1812.

The MPG engine 1714 validates the key code in step 1814. The engine 1714 preferably validates the key code by transmitting the key code and the music selection to the server 1702. The server 1702 searches the key code data 1711 to determine if the key code is found. If it is found and is correlated with the newly purchased music by the key code data 1711, the server 1702 indicates to the MPG engine 1714 that the song is validated. The MPG engine 1714 then plays the requested track in step 1816.

The MPG engine 1714 then retrieves all songs associated with the received key code in step 1818 and updates the authenticated song data in step 1820.

The embodiments described above generally describe the use of music-powered attribute data to adaptively select, initialize, create, modify, and/or control events that occur during game play, the features and/or behaviors of video game objects, including objects representative of characters or inanimate objects, within the game, and/or the general look and feel of the gaming environment. It should be noted that such embodiments have the effect of generally encouraging users to purchase or otherwise acquire music and/or associated music-powered attributes. For example, a user may already possess a digital copy of a song. However, without music-powered attributes associated with the song, the user will be unable to properly use the song in the gaming environment. Thus, the user may be encouraged to purchase an additional copy of the song that includes data defining the music-powered attributes related to the song. Alternatively, the user may be encouraged to purchase the music-powered attributes for the song without obtaining an additional copy of the song itself. Further, the architecture of the game unit 104 may be used, as described above, to provide advertisements to a user and to monitor the habits of the user so that more effective advertising may be conducted.

However, it should be emphasized that various modifications may be made to the above-described embodiments without departing from the spirit and scope of the present disclosure. As an example, several of the embodiments described above allow a user to select each song that is included in a playlist. Such a feature is unnecessary in some embodiments. For example, as described above, a user may select an artist or an album, and songs associated with the selected artist or album may be automatically included in the playlist. Further, other types of selections are possible. In fact, it is unnecessary for the sounds incorporated into the gaming environment to constitute songs or other types of music. For example, sound effects, such as the sound of rain, waves, auto engines, or gun fire, may be selected and used in lieu of songs. As with the songs described above, such sound effects may be associated with attributes that are used to select, initialize, create, modify, and/or control events that occur during game play, the features and/or behaviors of video game objects, including objects representative of characters or inanimate objects, within the game, and/or the general look and feel of the gaming environment.

Now, therefore, the following is claimed:

1. A video game system, comprising:
   memory for storing music information comprising predefined song data and predefined attribute data, said predefined song data defining a plurality of musical songs, said predefined attribute data defining attributes correlated with said songs; and
   logic configured to display video game objects and to enable a user to select at least one of said songs, said logic configured to provide, to a speaker, audio signals defined by said selected song based on said song data, said logic further configured to control a behavior of at least one of said video game objects, based on a plurality of said attributes correlated with said selected song, while said audio signals defined by said selected song are being provided to said speaker,
   wherein said logic is configured to track songs selected by said user over time to define a historical record indicative of song attributes for the tracked songs, and wherein said logic is further configured to define a personality of said one video game object based on said historical record such that said behavior of said one video game object at an instant in time is based on a plurality of song selections by said user.

2. The system of claim 1, wherein one of said plurality of said attributes corresponds to only a portion of said selected song, and wherein said logic is configured to control said behavior based on said one attribute only when audio signals defined by said portion are being provided to said speaker.

3. The system of claim 1, wherein said one attribute one of said plurality of said attributes is associated with an instantaneous event in said song, and wherein said logic is configured to modify said behavior based on said one attribute in response to said instantaneous event.

4. The system of claim 1, wherein one of said plurality of said attributes is indicative of at least one of a group consisting of: song title, song genre, song tempo, song theme, song sub-theme, song lyrics, or hit rating.

5. The system of claim 1, further comprising a user input device configured to receive a manual input from a user, wherein said logic selects said one song based on said user input.

6. The system of claim 1, further comprising a network device configured to receive an input from a server remotely located from said logic, wherein said logic selects said one song based on said input.

7. The system of claim 1, wherein said logic is configured to determine whether a current version of song attributes correlated with said selected song is stored in said memory, and wherein said logic is configured to automatically retrieve song attributes correlated with said selected song from a remote server if said current version of song attributes is not stored in said memory.

8. The system of claim 1, wherein said one video game object is associated with object personality data.

9. The system of claim 8, wherein said logic is configured to control said behavior of said one video game object based upon said object personality data and one of said plurality of said attributes.

10. The system of claim 9, wherein one of said plurality of said attributes is associated with motion data defining at least one motion for a video game object.

11. The system of claim 10, wherein when said audio signals defined by said selected song are being provided to said speaker, said one video game object appears to move in accordance with said motion data.

12. The system of claim 1, wherein said logic is configured to maintain a playlist identifying musical songs to be played during a run of a video game, said logic configured to receive a request to add said selected song to said playlist and to determine, in response to said request, whether said logic is authorized to add said selected song to said playlist.

13. The system of claim 12, wherein said logic is configured to determine whether said logic is authorized to add said selected song to said playlist based on a user-provided key code correlated with said selected song.

14. The system of claim 13, wherein said logic is configured to compare said user-provided key code to a valid key code retrieved from a list of valid key codes.

15. The system of claim 1, wherein one of said plurality of said attributes comprises a theme identifier that identifies a theme correlated with said selected song.

16. The system of claim 1, wherein at least one of said plurality of said attributes comprises a magnitude indicating a degree to which said one attribute is correlated with said selected song.

17. A video game system, comprising:
   memory for storing data defining graphical objects for use in a video game; and
   logic configured to enable a user to select at least one musical song to be played during a run of said video game, said logic configured to control a behavior of at least one of said graphical objects during said run of said video game based on an attribute correlated with said selected song, wherein said logic is configured to track songs selected by said user over time to define a historical record indicative of song attributes for the tracked songs, and wherein said logic is further configured to define a personality of said one graphical object based on said historical record such that said behavior of said one graphical object at an instant in time is based on a plurality of song selections by said user.

18. The system of claim 17, wherein said logic is configured to control said one graphical object based on said correlated attribute by changing an appearance of at least a portion of said one graphical object.

19. The system of claim 17, wherein said logic is configured to control said one graphical object based on said correlated attribute by modifying a behavior of said one graphical object.

20. The system of claim 17, wherein said logic is configured to control said one graphical object based on said correlated attribute such that said one graphical object appears to interact with at least one other of said graphical objects.

21. The system of claim 17, wherein said one graphical object is a character in said video game, and wherein said logic is configured to cause said character to appear in said video game based on said correlated attribute.

22. The system of claim 21, wherein said memory is configured to store data correlating said selected song with an artist and to store data defining an image of said artist, wherein said logic is configured to correlate said selected song with said data defining said image of said artist, and wherein said character has an image based on said data defining said image of said artist.

23. The system of claim 17, wherein said logic is configured to receive a user-provided key code associated with said selected song and to perform a comparison between said user-provided key code and another key code, and wherein said logic is configured to authorize attributes of said selected song for use in said video game based on said comparison.

24. The system of claim 17, wherein said correlated attribute corresponds to only a portion of said selected song, and wherein said logic is configured to control said one graphical object based on said correlated attribute only when said portion of said selected song is being played in said video game.

25. The system of claim 17, wherein said logic is configured to determine whether a current version of song attributes correlated with said selected song is stored in said memory, and wherein said logic is configured to automatically retrieve song attributes correlated with said selected song from a remote server if said current version of song attributes is not stored in said memory.

26. The system of claim 17, wherein said correlated attribute identifies a theme associated with said selected song.

27. The system of claim 17, wherein said correlated attribute identifies a lyric in said selected song.

28. The system of claim 17, wherein said correlated attribute comprises a popularity rating associated with said selected song.

29. The system of claim 17, wherein said correlated attribute comprises a magnitude indicating a degree to which said correlated attribute is correlated with said selected song.

30. A video game method, comprising the steps of:

storing music information comprising predefined song data and predefined attribute data, said predefined song data defining a plurality of musical songs, said predefined attribute data respectively correlating said songs with attributes;

displaying video game objects via a display device;

enabling a user to select one of said songs;

providing, to a speaker, audio signals defined by said selected song based on said song data;

controlling a behavior of at least one of said video game objects, based on a plurality of said attributes correlated with said selected song, while said audio signals defined by said selected song are being provided to said speaker;

tracking songs selected by said user over time thereby defining a historical record indicative of song attributes for the tracked songs; and defining a personality of said one video game object based on said historical record such that said behavior of said one video game object at an instant in time is based on a plurality of song selections by said user.

31. The method of claim 30, further comprising the step of associating one of said plurality of said attributes with only a portion of said selected song.

32. The method of claim 31, wherein said controlling step is performed only when audio signals defined by said portion are being provided to said speaker.

33. The method of claim 30, further comprising the step of associating one of said plurality of said attributes with an instantaneous event in said song.

34. The method of claim 33, wherein said controlling step is performed in response to said instantaneous event.

35. The method of claim 30, further comprising the step of associating one of said plurality of said attributes with motion data defining at least one motion for a video game object.

36. The method of claim 35, wherein said controlling step is performed such that said one video game object appears to move in accordance with said motion data, when said audio signals defined by said selected song are being provided to said speaker.

37. The method of claim 30, further comprising the step of associating said selected song with a theme via one of said plurality of said attributes.

38. The method of claim 30, further comprising the step of indicating, one of said plurality of said attributes, a popularity rating associated with said selected song.

39. The method of claim 30, further comprising the step of indicating an amount that one of said plurality of said attributes is correlated with said selected song.

40. A video game method, comprising the steps of:

storing data defining graphical objects for use in a video game;

displaying said graphical objects during a run of said video game;

enabling a user to select at least one musical song to be played during said run of said video game;

controlling a behavior of at least one of said graphical objects based on an attribute correlated with said one song, said attribute based on a lyrical topic of said selected song;

tracking songs selected by said user over time thereby defining a historical record indicative of song attributes for the tracked songs; and defining a personality of said one video game object based on said historical record such that said behavior of said one video game object at an instant in time is based on a plurality of song selections by said user.

41. The method of claim 40, wherein said controlling step is performed such that a behavior of said one graphical object is modified.

42. The method of claim 40, wherein said controlling step is performed such that said one graphical object appears to interact with at least one other graphical object.

43. The method of claim 40, wherein said one graphical object is a character in said video game.

44. The method of claim 40, wherein said controlling step comprises the step of causing said character to be displayed in said displaying step.

45. The method of claim 40, further comprising the steps of:
   receiving a user-provided key code;
   comparing said user-provided key to another key code correlated with said one song; and
   enabling said controlling step based on said comparing step.

46. The method of claim 40, further comprising the steps of:
   correlating said attribute with only a portion of said one song; and
   enabling said controlling step only when said portion is being played within said video game.

47. The method of claim 40, further comprising the step of associating said selected song with a theme via said correlated attribute.

48. The method of claim 40, further comprising the step of indicating, via said correlated attribute, a popularity rating associated with said selected song.

49. The method of claim 40, further comprising the step of indicating an amount that said correlated attribute is correlated with said selected song.

50. The system of claim 1, wherein one of said plurality of said attributes correlated with said selected song is based on a lyrical meaning of said selected song.

51. A video game system, comprising:
   memory for storing music information comprising predefined song data and predefined attribute data, said predefined song data defining a plurality of musical songs, said predefined attribute data defining attributes correlated with said songs; and
   logic configured to display video game objects and to enable a user to select at least one of said songs, said logic configured to provide, to a speaker, audio signals defined by said selected song based on said song data, said logic further configured to control a behavior of at least one of said video game objects, based on a plurality of said attributes correlated with said selected song, while said audio signals defined by said selected song are being provided to said speaker,
   wherein said logic is further configured to control, while said audio signals defined by said selected song are being provided to said speaker, said behavior of said one video game object based on another of said attributes correlated with another song selected by said user.

52. The system of claim 1, wherein at least one of said plurality of said attributes is specified by a user.

53. The system of claim 1, wherein each of said plurality of said attributes correlated with said selected song indicates that said selected song is of a respective song type such that said plurality of said attributes indicates that said song is of multiple song types.

54. The system of claim 16, wherein said magnitude is specified by a user.

55. A video game method, comprising the steps of:
   storing music information comprising predefined song data and predefined attribute data, said predefined song data defining a plurality of musical songs, said predefined attribute data respectively correlating said songs with attributes;
   displaying video game objects via a display device;
   enabling a user to select one of said songs;
   providing, to a speaker, audio signals defined by said selected song based on said song data; and
   controlling a behavior of at least one of said video game objects, based on a plurality of said attributes correlated with said selected song, while said audio signals defined by said selected song are being provided to said speaker, wherein said controlling step is based on another of said attributes correlated with another song selected by said user.

* * * * *